US012806725B2

(12) United States Patent
Schwartz et al.

(10) Patent No.: US 12,806,725 B2
(45) Date of Patent: Nov. 24, 2026

(54) TOOL HOLDER ASSEMBLY, AND SEATING/SECURING COMPONENTS AND ACTIVATION SYSTEMS THEREFOR

(71) Applicant: Wilson Tool International Inc., White Bear Lake, MN (US)

(72) Inventors: Anthony D. Schwartz, Forest Lake, MN (US); Kevin A. Johnston, Deer Park, WI (US); Brian J. Lee, Elk River, MN (US)

(73) Assignee: WILSON TOOL INTERNATIONAL INC., White Bear Lake, MN (US)

( * ) Notice: Subject to any disclaimer, the term of this patent is extended or adjusted under 35 U.S.C. 154(b) by 606 days.

(21) Appl. No.: 18/331,158

(22) Filed: Jun. 7, 2023

(65) Prior Publication Data

US 2023/0398649 A1 Dec. 14, 2023

Related U.S. Application Data

(60) Provisional application No. 63/350,410, filed on Jun. 8, 2022.

(51) Int. Cl.

*B23Q 3/155* (2006.01)
*B21D 5/02* (2006.01)
*B23Q 1/70* (2006.01)

(52) U.S. Cl.

CPC ......... *B23Q 3/15553* (2013.01); *B23Q 1/706* (2013.01); *B21D 5/0236* (2013.01)

(58) Field of Classification Search

CPC ................ B21D 5/0236; B21D 5/0209; B23Q 3/15553; B23Q 1/706

See application file for complete search history.

(56) References Cited

U.S. PATENT DOCUMENTS

| | | | | |
|---|---|---|---|---|
| 5,245,854 | A | 9/1993 | Bruggink et al. | |
| 5,642,642 | A | 7/1997 | Kawano | |
| 2004/0074278 | A1* | 4/2004 | Hayashi | B21D 5/0209 72/481.2 |
| 2005/0284206 | A1 | 12/2005 | Morehead et al. | |
| 2006/0174679 | A1 | 8/2006 | Pabich et al. | |
| 2011/0247389 | A1* | 10/2011 | Rouweler | B21D 5/0236 72/482.3 |
| 2012/0167649 | A1 | 7/2012 | Bammer et al. | |
| 2019/0001387 | A1 | 1/2019 | Sundquist et al. | |

(Continued)

FOREIGN PATENT DOCUMENTS

| | | | |
|---|---|---|---|
| EP | 1846178 | A2 | 10/2007 |
| EP | 2364228 | A1 | 9/2011 |

(Continued)

OTHER PUBLICATIONS

Translation of WO 91/03332 (Year: 1991).*

(Continued)

*Primary Examiner* — Teresa M Ekiert

(74) *Attorney, Agent, or Firm* — Fredrikson & Byron, P.A.

(57) ABSTRACT

A tool holder assembly and insert body and activation system used with the assembly. The insert body of the tool holder assembly can be configured to shift as needed to engage tooling when the assembly is activated. In some cases, the insert body can be configured to shift further to better engage the tooling. The activation system can be electrical.

34 Claims, 25 Drawing Sheets

(56) References Cited

U.S. PATENT DOCUMENTS

| | | | |
|---|---|---|---|
| 2020/0406411 | A1 | 12/2020 | Gerst et al. |
| 2024/0173760 | A1 | 5/2024 | Schwartz et al. |

FOREIGN PATENT DOCUMENTS

| | | | | |
|---|---|---|---|---|
| EP | 3137238 | A1 | | 3/2017 |
| WO | WO9103332 | | * | 3/1991 |
| WO | 02092253 | A2 | | 11/2002 |
| WO | 2023239824 | A1 | | 12/2023 |

OTHER PUBLICATIONS

International Searching Authority "Search Report and Written Opinion" From Application No. PCT/US2023/024763, Mailed Nov. 15, 2023, pp. 1-21.
International Patent Application No. PCT/US2023/024763, Invitation to Pay Additional Fees and Partial Search Report mailed Sep. 25, 2023, 12 pages.
International Searching Authority "Search Report and Written Opinion" From Application No. PCT/US2024/032824, Mailed Jan. 23, 2025, pp. 23.
International Patent Application No. PCT/US2024/032824, Invitation to Pay Additional Fees and Partial Search Report, mailed Oct. 4, 2024, 14 pages.

* cited by examiner

TOOL HOLDER ASSEMBLY, AND SEATING/SECURING COMPONENTS AND ACTIVATION SYSTEMS THEREFOR

RELATED APPLICATIONS

The present application claims priority to U.S. Provisional Patent Application No. 63/350,410, filed Jun. 8, 2022, the teachings of which are incorporated herein by reference.

FIELD OF THE INVENTION

The present invention relates to tool holder assemblies for use with industrial machines or equipment, and seating/securing components and activation systems for such assemblies.

BACKGROUND

Sheet metal and other workpieces can be fabricated into a wide range of useful products. The fabrication (i.e., manufacturing) processes commonly employed involve bending, folding, and/or forming holes in the sheet metal and other workpieces. The equipment used for such processes are of many types, including turret presses and other industrial presses (such as single-station presses), Trumpf style machines and other rail type systems, press brakes, sheet feed systems, coil feed systems, and other types of fabrication equipment adapted for punching or pressing sheet materials.

Concerning press brakes, they are commonly used for deforming metal workpieces, and equipped with a lower beam (or table) and an upper beam (or table). One of the beams (typically the upper beam) is configured to be vertically movable toward the other beam. Forming tools are mounted to the beams so that when one beam is brought toward the other, a workpiece positioned therebetween can be formed, e.g., bent into an appropriate shape. Typically, the upper beam is configured to hold a male forming tool (a punch) having a bottom workpiece-deforming surface (such as a V-shaped surface), and the bottom beam is configured to hold an appropriately-shaped female tool (a die) having an upper surface vertically aligned with the workpiece-deforming surface of the male tool.

As is known, forming tools are commonly mounted to press brake beams using one or more tool holders provided on the beams. Particularly, upper portions of the tools, commonly referred to as tangs or shanks, are inserted between opposing walls of the holder, and these walls are configured to form a channel within which the tool tang can be secured. Quite often, the channel is defined via a stationary portion of the tool holder and an opposing movable portion of the holder.

In the pursuit of designing tool holders for industrial machines, e.g., for press brakes, many factors need to be considered. One factor relates to variability, particularly with respect to the various tooling styles that could be used, with such styles potentially having different tang profiles. For example, the surface or extent of the tang that extends upward from the tool safety slot can be straight (substantially vertical), beveled (having an angle from vertical), or curved. Some tool holders, e.g., designed for press brake applications, have been configured to require use of adaptors. While a viable solution for accommodating different tang styles, adaptors necessitate proper positioning and/or maintenance. In addition, adaptors may need to be moved different distances corresponding to the differing tang styles. These differing movements typically dictate precise regulation of force, or else damage could result to the tangs and/or the tool holders from contact with the adaptors. Such regulation has conventionally been provided via hydraulic, pneumatic, electric, or other like means, whereby the applied forces can be precisely regulated. However, incorporation of regulating elements adds complexity and overall cost to the designs.

Another factor to consider in designing tool holders relates to tolerances. For example, there can be slight degrees of variance with each tool and tool holder design, such as with general dimensions of the tool (e.g., its tang) or actions of the tool holder (e.g., closing action(s) of one or more movable portions of the holder). When separately considered, these variances can be somewhat negligible; however, when encountered collectively, such as in the circumstance of loading forming tools in tool holders, such variances can result in a corresponding degree of play for the tooling. To account for such variances, some tool holders have been equipped with shape memory materials or structures such as springs to compensate for the tolerances with the designs in these areas. However, even with these elements, issues of looseness or play between tool and holder can arise over time, often due to wear. Moreover, such shape memory materials or structures may require periodic maintenance or replacement.

Further factors to consider in designing tool holders relate to fabrication and use of the tool holder. With respect to fabrication, if the tool holder is warranted both for new and retrofit designs, particularly for press brake applications, then the holder designs will need to be capable of being constructed/conformed to different lengths, as required, while also having some form of easily adaptable mounting system relative to its installation. Regarding use of the holder, questions may center around how the holder will be activated and how the activation will be divided/controlled across the tool holder. As already described, the activation force needs to sufficiently provide for securement of the tooling, yet not be excessive whereby damage to the holder and/or tooling is a concern. In addition, the activation force may need to be regulated based on length of the tool holder to be used/activated and the tooling type to be secured. Incorporating such regulating elements to tool holder designs is possible, yet adds further complexity and overall cost to the designs.

Thus, there remains room for a tool holder assembly that can effectively and efficiently account for the above-described issues as well as others, and in doing so, provides a superior holder design.

SUMMARY OF THE INVENTION

Embodiments of the invention involve a tool holder assembly, as well as insert body and activation system used therewith. In some cases, the insert body of the tool holder assembly is configured to shift as needed to engage tooling when the assembly is activated. For instance, the insert body can correspondingly pivot based on the shape of tang of the tooling and the orientation in which the body can best engage the tang. The insert body can have one or more fingers. In some cases, the tooling to be engaged can be one or more tools, whereby the tang of each of the tools can be engaged by one or more of the fingers of the insert body. For some embodiments, the tool holder assembly is electrically activated. In some cases, the tool holder assembly is integrally formed with, and configured for activating, a single insert body. In other cases, the tool holder assembly may be formed with, and configured for activating, a plurality of insert bodies, whereby the insert bodies can be collectively or independently activatable. In both cases, a plurality of the tool holder assemblies can be adaptively joined to form a tool holder for one of or both the upper beam and lower beam of a press brake. In such cases, the extent of the tool holder can be correspondingly prescribed, based on the machine size. Following set-up, select quantities of the tool holder assemblies provided across the beam can be used as needed, based on the intended machining job and the tooling required therefor.

In one embodiment, a tool holder assembly is provided. The assembly includes a stationary portion having a vertical side wall that partially defines a tool channel, a movable portion situated opposite the vertical side wall of the stationary portion, and an electrical activation system to which the movable portion is operatively linked. The electrical activation system has an output shaft which is movable upon activation of the system and when moved results in corresponding movement of the movable portion. The electrical activation system includes a motor and gearbox from which the output shaft extends. The corresponding movement of the movable portion is in a first direction relative to the tool channel and results in locked engagement with tooling when loaded in the channel, wherein the output shaft upon the activation of the system reaches a first position. The first position represents a locked position for the output shaft and a corresponding locked position for the movable portion via use of the motor and gearbox pairing, wherein said locked position is maintained even in event of loss of power to the electrical activation system.

In another embodiment, a tool holder assembly is provided. The assembly includes a stationary portion having a vertical side wall that partially defines a tool channel, a movable portion situated opposite the vertical side wall of the stationary portion, and an activation system to which the movable portion is operatively linked. The activation system has an output shaft which is movable upon activation of the system and when moved results in movement of the movable portion in a first direction toward the tool channel to secure tooling when loaded within the tool channel. Wherein at time of contact between the movable portion and the tooling when loaded in the tool channel, the movable portion is shifted in a second direction to a new orientation relative to the tooling in the event a better engagement between the moveable portion and the tooling can be achieved, wherein movement of the movable portion in the second direction stops at the new orientation when the movable portion becomes engagingly locked with the tooling.

In certain embodiments of the invention, a tool holder assembly is provided, comprising a stationary portion, a movable portion, and an activation system. The stationary portion has a vertical side wall that bounds a tool channel. The movable portion is situated opposite the vertical side wall of the stationary portion. The moveable portion comprises a body that includes a base portion and two offset fingers. The two offset fingers project outwardly from the base portion toward the tool channel. The base portion of the body has formed therein an interiorly-threaded opening. The activation system is operatively linked to the movable portion by an exteriorly-threaded output shaft in threaded engagement with the interiorly-threaded opening in the base portion of the body, such that the exteriorly-threaded output shaft is configured to rotate in a first direction upon activation of the activation system and thereby move the movable portion toward the tool channel such that the two offset fingers engage tooling when loaded in the tool channel. The body of the moveable portion can optionally have a generally triangular configuration. Additionally or alternatively, each of the two fingers preferably has a leading end region with a ramp surface configured to engage the tooling when loaded in the tool channel. In many embodiments, the tool holder has a length configured to extend along a length of an upper beam of a press brake, and the two leading end regions of the two fingers are spaced apart along the length of the tool holder. In addition, the threaded engagement of the exteriorly-threaded output shaft with the interiorly-threaded opening in the base portion of the body preferably provides a freedom of movement for the moveable portion to pivot about the exteriorly-threaded output shaft when the activation system is actuated so as to move the movable portion against the tooling loaded in the tool channel. In the present embodiments, the activation system preferably is an electrical activation system comprising a motor and a gearbox from which the exteriorly-threaded output shaft extends. It is to be appreciated, however, that various other types of activation systems can alternatively be used.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and other elements employ that which is known to those of ordinary skill in the field of the invention. Those skilled in the art will recognize that many of the noted examples have a variety of suitable alternatives.

Figure 1:
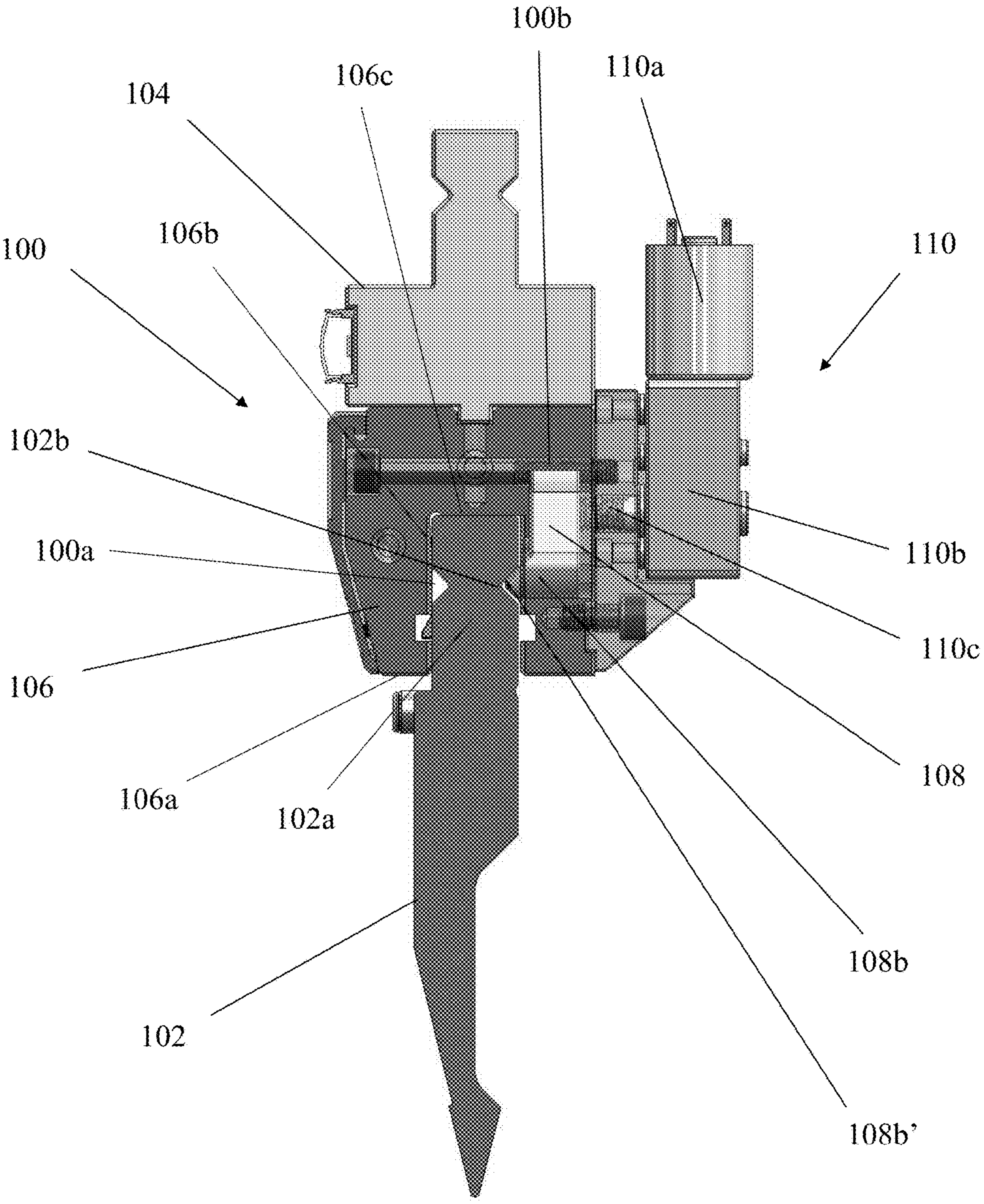
FIG. 1 is a cross sectional view of a tool holder assembly in accordance with certain embodiments of the invention, the holder assembly being shown in closed configuration and linked to an exemplary adaptor and having an exemplary forming tool loaded therein, with the view taken across lines I-I of FIG. 5A.

FIG. 1 shows a cross sectional view of a tool holder assembly 100 in accordance with certain embodiments of the invention. The holder assembly 100 is shown with an exemplary forming tool 102 loaded therein and being coupled to an exemplary adaptor 104 for coupling to a press brake (upper) beam (not shown). While embodiments described herein are applicable with a wide variety of tool styles, such as American, European, Bystronic, and Trumpf/Wilson Tool, it is to be understood that the clamp would foreseeably function with other tool styles/tang types as well. In addition, while embodiments herein are depicted relative to a press brake upper beam, the invention is also applicable to a lower beam of a press brake. Further, while the assembly 100 can be operatively coupled to a press brake beam via adaptor 104 as illustrated, a variety of other adaptors and/or configurations (such as a Z1 or Z2 for Euro style beams or Universal Bolt Pattern (UBP) mounting direct to OEM upper beams) could alternatively be used. As further alternative, the assembly 100 could be configured to have an integral coupling to join with a beam of the press brake, and thus not require a separate adaptor for such coupling. In further embodiments, the holder assembly 100 could be used with other industrial machines. For example, the tool holder assembly 100 can be used with machines configured to provide any of a variety of forming processes, such as bending, folding, and/or forming holes in sheet metal and other workpieces.

Figure 2A:
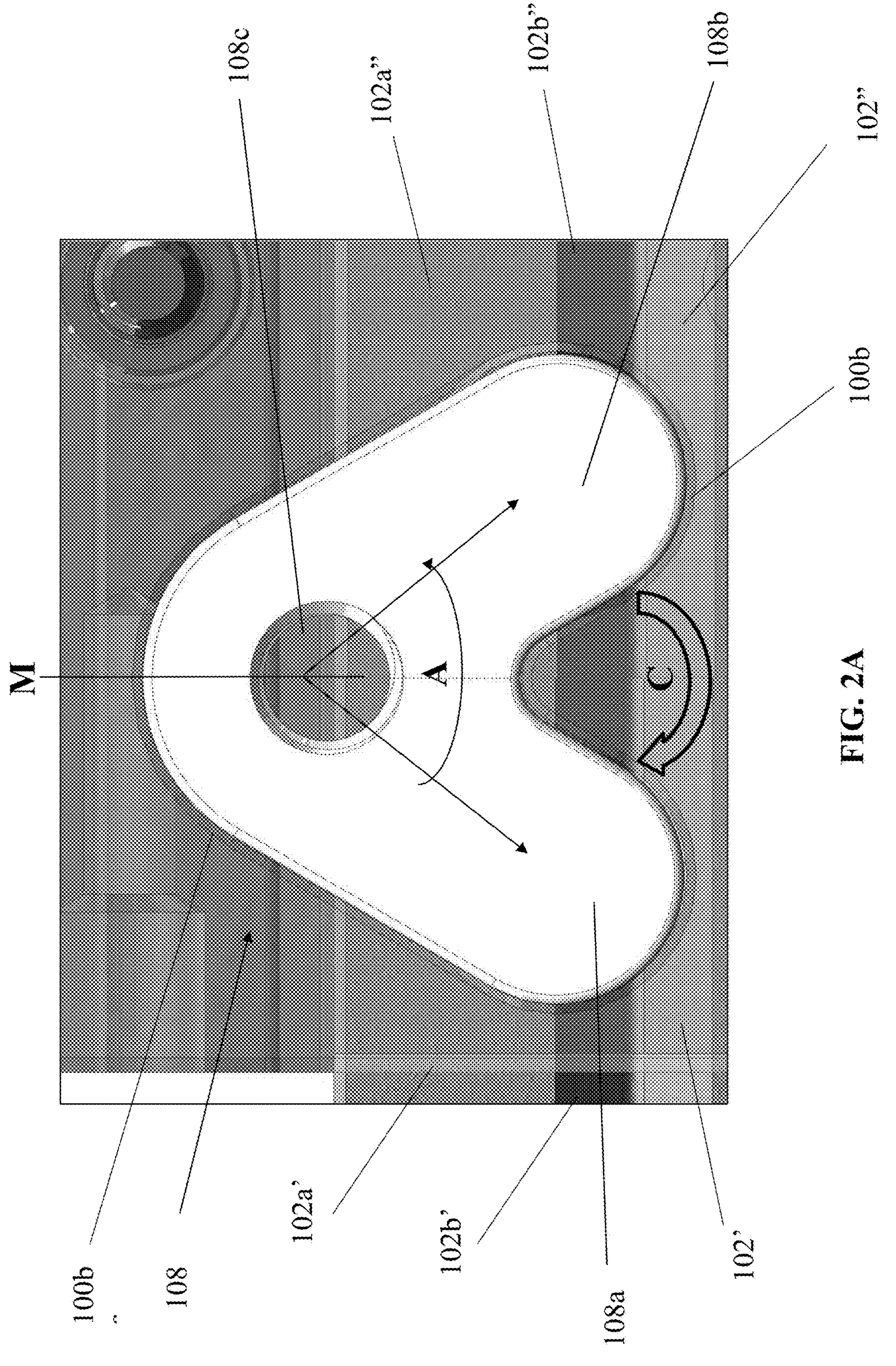
FIG. 2A is a rear view of an insert body shown in exemplary use in accordance with certain embodiments of the invention.
Figure 2B:
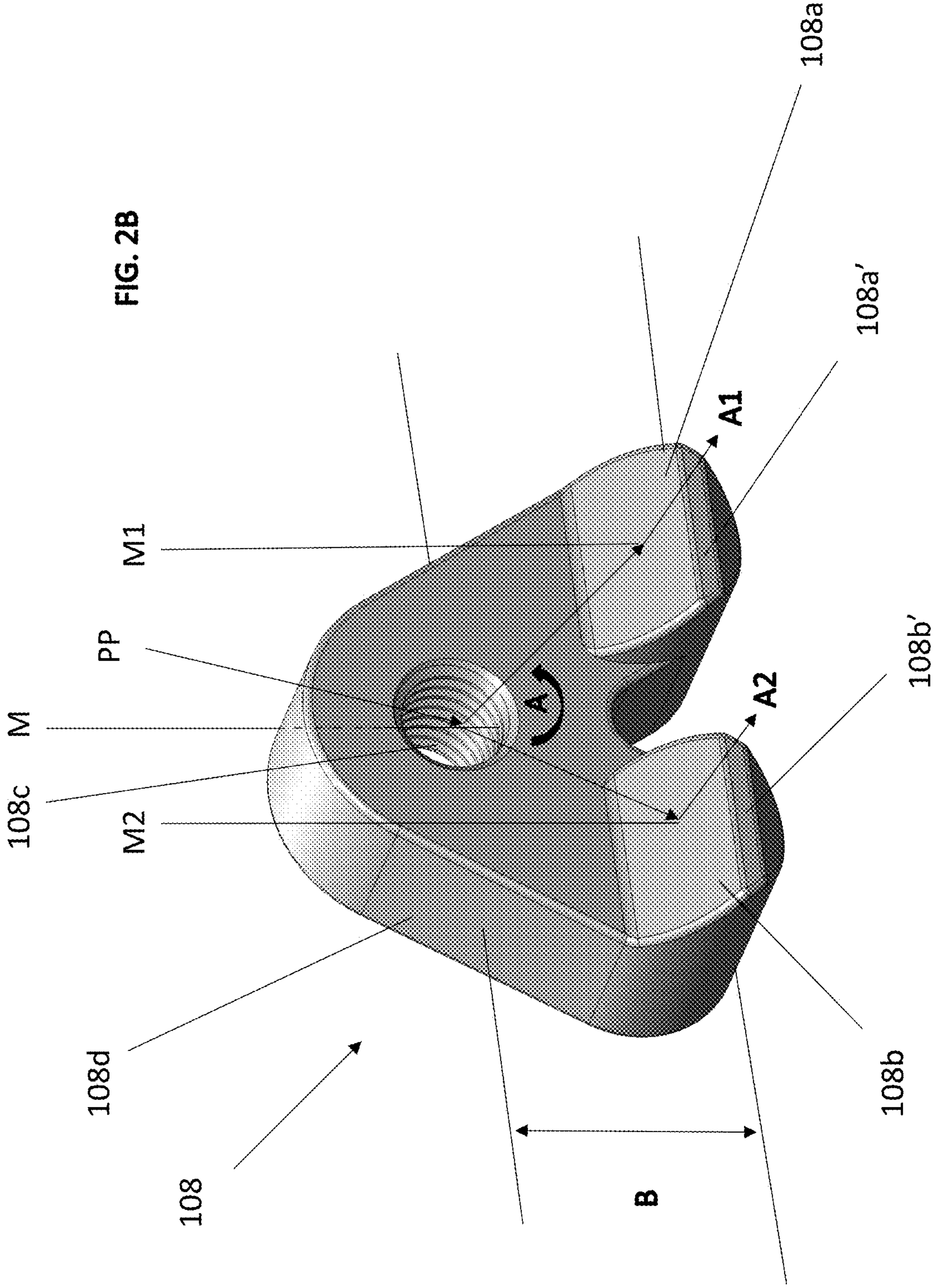
FIG. 2B is a front perspective view of the insert body of FIG. 2A in accordance with certain embodiments of the invention.

Continuing with FIG. 1, the illustrated tool holder assembly 100 has two principal components used for seating and securing tooling to the assembly 100, namely a stationary portion 106 and one or more movable portions. One of the movable portions is an insert body 108. For further detail regarding a first exemplary design of such an insert body 108, attention is shifted to FIGS. 2A and 2B, which illustrate rear and front perspective views of the design (with FIG. 2A showing the insert body 108 in exemplary use, detailed herein later). With continued reference to FIGS. 2A and 2B, in certain embodiments, the insert body 108 has a base portion and at least one finger. In more preferable embodiments, the body 108 has two or more fingers. To that end, the insert body 108 is exemplified with base portion **108*d* and first and second fingers 108*a*, 108*b*. In certain embodiments, as shown, the base portion 108*d* has a generally triangular configuration, and the fingers 108*a*, 108*b* are configured to protrude from the base portion 108*d*. In certain embodiments, as shown, the fingers 108*a*, 108*b* are offset so as to extend along (e.g., be elongated along) differing axes A1, A2. In certain embodiments, as shown, the axes A1, A2 can be parallel, yet the invention should not be so limited. For example, one or more of the fingers 108*a*, 108 could be protruding from the base portion 108*d* so as to angle inwardly or outwardly relative to the vertical midline M of the insert M. As shown, vertical midpoints M1, M2 of the fingers 108*a*, 108*b* may be separated by an angle A, with vertex of the angle being at a pivot point PP (detailed later) along a vertical midline M of the insert. In using the insert body 108, the fingers 108*a*, 108*b* can contact and engage differing points across the tooling loaded within the tool channel 100*a*. Particularly, the fingers 108*a*, 108*b* of the insert body 108 are designed to extend at differing points from the insert 108 to achieve a more effective engagement with the tooling. For example, the point (or location) of contact made with each of the two fingers 108*a*, 108*b* can be distinct, with each finger forming its own discrete engagement relationship with the tooling. To that end, engagement with the tooling may be purer with one of the fingers than the other due to tolerance in the tooling. As such, having the fingers 108*a*, 108*b*** offset from each other affords first and second opportunities to establish better engagement with the tooling.

Continuing with FIGS. 2A/2B, the angle of separation between the midpoints M1, M2 of the fingers **108*a*, 108*b*, relative to the pivot point PP, can be selectively chosen based on the intended use of the tool holder assembly 100. Ideally, the angle of separation A would be as close to 180° as possible. However, the insert body 108 can function advantageously with separation angle being less than 180°. In certain embodiments, the angle A could range from about 35° to about 120°. In more preferable embodiments, the angle A could range from about 50° to about 100°; and in even more preferable embodiments, the angle A could range from about 60° to about 80°. In certain embodiments, the insert body could include more than two fingers, with angular separation between each adjacent pair. For example, in the case of an insert body with three fingers, there would be a first angle between a first outer finger and a center finger and a second angle between the center finger and a second outer finger. In the case of more than two fingers, the total of the separation angles among the fingers would ideally be as close to 180° as possible. However, the insert body 108** can advantageously function with separation angles totaling less than 180°. For example, in designs with three fingers, if desired, the first and second angles between first and second fingers and between second and third fingers could be the same; however, the invention is not so limited. Depending on the tooling to be secured, it may be preferable to have differing angles for such first and second angles.

Figure 2C:
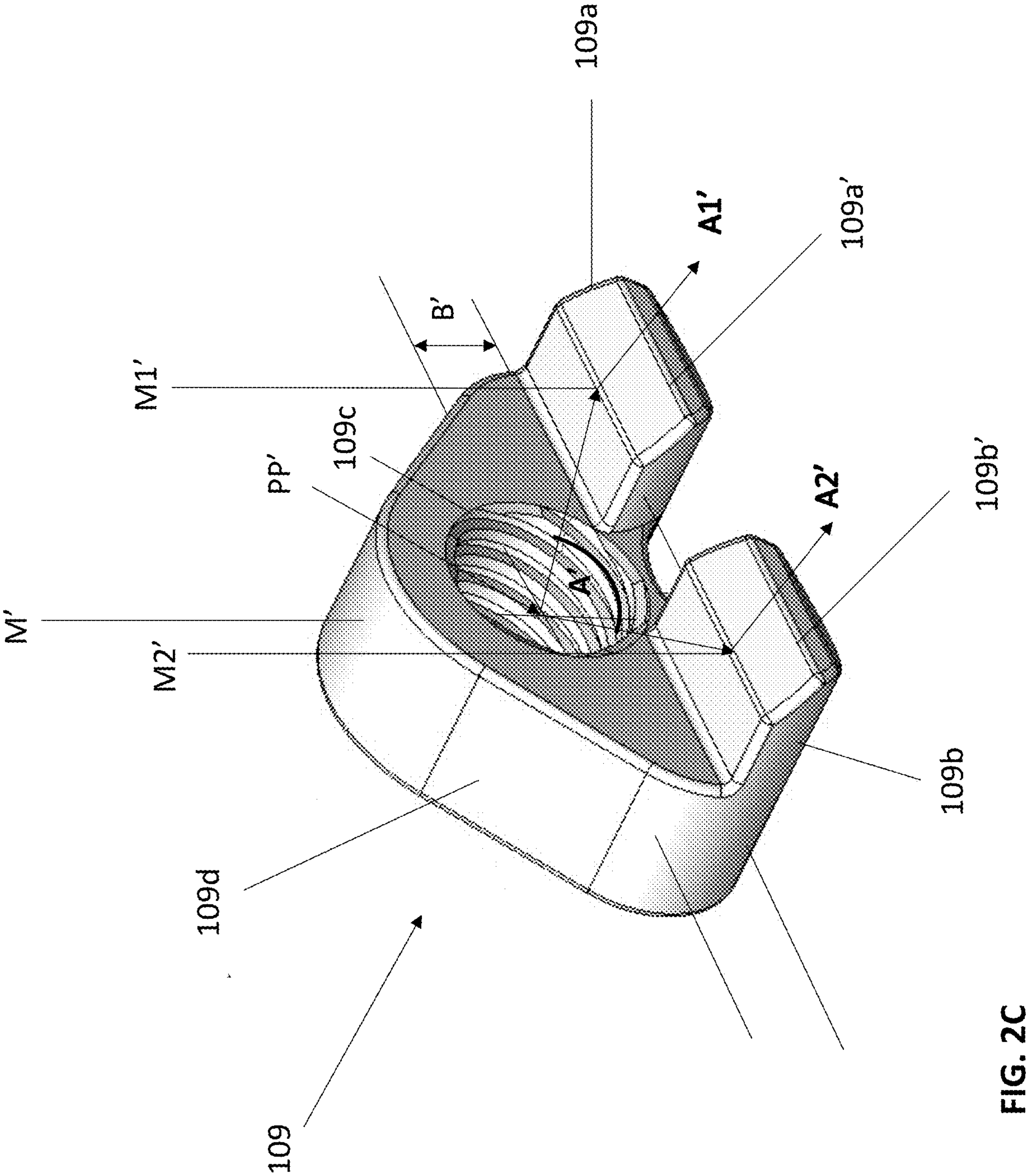
FIG. 2C is a front perspective view of a further insert body in accordance with certain embodiments of the invention.

Moving on to FIG. 2C, a further exemplary design of an insert body 109 is illustrated. While not shown in the tool holder assembly 100 of FIG. 1, the assembly 100 could be configured to function with the insert body 109. The insert body 109 has numerous similarities to the insert body 108 of FIGS. 2A/2B, such as including multiple fingers (e.g., first and second fingers 109*a*, 109*b*) protruding from a base portion 109*d* so as to extend along axes A1', A2', for contacting/engaging differing points across tooling, e.g., when loaded within a tool channel of tool assembly, such as assembly 100 of FIG. 1. In certain embodiments as shown, the fingers 109*a*, 109*b* are offset (e.g., spaced apart) from each other, enabling a distinct point or location of contact (and effective engagement with the tooling) via each of the fingers. Similar to the insert body 108 of FIGS. 2A/B, the axes A1', A2' can be parallel, yet the invention should not be so limited.

Continuing with the insert body 109 of FIG. 2C, it too has a generally triangular configuration, yet has a reduced profile in comparison to the insert body 108 of FIGS. 2A/2B. To that end, the central bore 109*c* defined in the base portion 109*d* is located at a lower height B' (as measured from the bottom of the insert body 109), and thus is closer to the fingers 109*a*, 109*b* of the insert body 109. As a result, the separation angle A' between central vertical midlines M1', M2' of the fingers 109*a*, 109*b* (with vertex of the angle being at a pivot point PP along a vertical midline M' of the insert body 109) is larger than the separation angle A for the insert body 108 of FIGS. 2A/2B. Ideally, the angle of separation A' would be as close to 180° as possible. However, the insert body 109 can function advantageously with separation angle being less than 180°. In certain embodiments, the angle A' could range from about 105° to about 175°. In more preferable embodiments, the angle A' could range from about 125° to about 160°; and in even more preferable embodiments, the angle A' could range from about 140° to about 150°. With this separation angle being increased, it should be appreciated that the distance between the vertical midlines of the fingers 109*a*, 109*b* is increased. Increasing this distance provides more of a compact design for the insert body 109, which further counters overall play or looseness between the insert body 109 and tooling within a holder, via more secure force transfer from the insert body 109 across its fingers 109*a*, 109*b* onto the tooling.

Like the insert body 108 of FIGS. 2A/2B, the insert body 109 of FIG. 2C can have more than two fingers, with angular separation between each adjacent pair of fingers. For example, in the case of an insert body with three fingers, there would be a first angle between a first outer finger and a center finger and a second angle between the center finger and a second outer finger. Ideally, the total of the separation angles would be as close to 180° as possible. However, the insert body 109 can function advantageously with separation angles totaling less than 180°. If desired, the first and second angles could be the same; however, the invention is not so limited. For example, depending on the tooling to be secured, it may be preferable to have differing angles for such first and second angles.

Shifting back to FIG. 1 (and as already noted), either the insert body 108 of FIGS. 2A/2B or the insert body 109 of FIG. 2C could be used therewith. To that end, and with reference to FIG. 2A, the insert body 108 is positioned in a pocket (or cavity) 100*b* of the tool holder 100. When activated, the insert body 108 (or 109) would be moved in a first direction to shallower position in the pocket 100*b*, e.g., toward and into (or further into) the tool channel 100*a* of the holder assembly 100. As a result of this movement, and as FIG. 1 shows relative to insert body 108, its fingers 108*a*, 108*b* would extend into the tool channel 100*a* to correspondingly engage one or more tangs 102*a* of tools 102 loaded into the channel 100*a*. While finger 108*a* is not in the view of FIG. 1, the fingers 108*a*, 108*b* can be configured to be similar in shape and length. Thus, distal ends (or "tool-engagement ends") 108*a*', 108*b*' of the fingers 108*a*, 108*b*, respectively, are sized and shaped to correspondingly be received within and mate with a groove 102*b* defined in the tool tang 102*a*. When activated, the insert body 108 is moved toward (and into, or further into) the tool channel 100*a*, with the finger distal ends 108*a*', 108*b*' each entering (or moving further into) the tool channel 100*a* and contacting/engaging with the tang 102*a* of the tool 102 loaded therein. In certain embodiments, the ends 108*a*', 108*b* of each of the two fingers 102*a*, 108*b* has a leading end region with a ramp surface configured to engage the tool 102 when loaded in the tool channel 100*a*.

In certain embodiments, the tool holder 100 has a length configured to extend along a length of an upper beam of a press brake, with the two leading end regions 108*a*', 108*b*' of the two fingers 108*a*, 108*b* being spaced apart along the length of the tool holder. Relative to securing (or "clamping") the tool 102 (and with continued reference to insert body 108), the process involves opposing side surfaces of the tool tang 102*a* being contacted by corresponding surfaces of the stationary portion 106 and the insert body 108. Such contacts collectively serve to fixedly clamp the tool 102 between the insert body 108 and the stationary portion 106. In preferred embodiments, securing and seating of the tool 102 within the tool channel 100*a* occurs simultaneously. However (and as further detailed herein), seating the tool 102 involves a vertical lifting of the tang 102*a* within the channel 100*a* so that one or more tang upper surfaces are brought into flush contact with one or more corresponding surfaces of the stationary portion 106. Once clamped and seated, the tool 102 is in an operative position, i.e., not necessitating any other positioning steps prior to using the tool for its intended machining purpose. In the present embodiments, clamping and seating preferably occur simultaneously (e.g., by a single movement of the insert body 108).

In certain embodiments, as shown, the stationary portion 106 includes a lower wall 106*a*, a side wall 106*b*, and an upper wall 106*c*. The side wall 106*b* and the upper wall 106*c* bound the tool channel 100*a*, which is configured for seating and securing tooling therein. For example, tooling can often be secured (or "clamped") against the side wall 106*b* of the stationary portion 106, while the tooling is also seated against one or more of the lower wall 106*a* and the upper wall 106*c* (which is the case illustrated in FIG. 1). As exemplarily depicted in FIG. 1 (and with reference to FIGS.

3A and 3B, showing views of tool holder assembly 100 in open/unclamped and closed/clamped configurations, respectively), the insert body 108 can be used in concert with the side wall 106*b* of the stationary portion 110 for securing (or "clamping") one or more forming tools 102 therebetween, and thus to the tool holder assembly 100. Relative to the tooling being seated, this is a function of the insert body 108 continuing to be driven into groove 102*b* defined in the tool tang 102*a*. In certain embodiments, distal ends 108*a*', 108*b*' of the fingers 108*a*, 108*b*, respectively, of the insert body 108 have ramped upper surfaces (e.g., angled from horizontal) so they mate (e.g., cam) with and exert force on ramped upper surfaces bounding the groove 102*b*. Thus, activation (and corresponding driving) of the insert body 108 into the tang groove 102*b* would cause the tool 102 to both be secured against side wall 106*b* and be seated against the lower wall 106*a*, against the upper wall 106*c*, or both, depending on the tool type 102.

Embodiments of the invention relate to an insert body being used to secure (or "clamp") and seat tooling within the tool holder assembly 100. As already described, the insert body 108 of FIGS. 2A/2B or the insert body 109 of FIG. 2C can be used, and when activated, is driven toward and into (or further into) the tool channel 100*a* to engage the tool tang 102*a* for securement/seating purposes. In addition, the insert bodies 108, 109 of FIGS. 2A/2B and 2C, respectively, preferably are each configured to shift in orientation upon contact and initial engagement with the tool tang so as to have an advantageous clamped/locked engagement with the tang.

For example, while the distal ends 108*a*', 108*b*' of the fingers 108*a*, 108*b* of insert body 108 (and similarly, the distal ends 109*a*', 109*b*' of the fingers 109*a*, 109*b* of insert body 109) can fit routinely in a similarly-sized tang groove 102*b*, if a particular groove 102*b* is of differing size, each insert body 108 and 109 is configured to shift (along with the fingers 108*a*, 108*b* and 109*a*, 109*b*) as needed to engage tooling when the assembly 100 is activated. In certain embodiments, as further detailed herein, each insert body 108 and 109 can correspondingly pivot (based on the shape of tang groove 102*b* of the tooling) to an orientation in which the fingers 108*a*, 108*b* and 109*a*, 109*b* can best engage the groove 102*b*. In some embodiments, such pivoting can involve rotation of the insert body relative to the tool 102 in combination with movement in directions either inward or outward from the groove 102*b* depending on how the finger distal ends 108*a*', 108*b*' and 109*a*', 109*b*' best lockingly engage with the groove 102*b*.

As already noted with reference to FIG. 1, the tooling loaded in the tool channel 100*a* can be one or more tools 102, with the tang 102*a* of each tool 102 being engaged by one or more of the fingers 108*a*, 108*b* of the insert body 108 (or alternately, by one or more fingers 109*a*, 109*b* of the insert body 109). To that end, depending on the quantity of tools being secured/seated and the tang profile of each of those tools, the insert body 108 (or body 109) may pivot slightly or more significantly from its default orientation to best secure/seat such tools. For example, as shown in FIG. 2A, the insert body 108 is engaged with two tools 102' and 102". However, the grooves 102*b*' and 102*b*" in their respective tangs 102*a*' and 102*a*" are not aligned, with the tang channel 102*b*' being higher than the other tang channel 102*b*". Accordingly, the insert body 108 is able to rotate (e.g., in clockwise direction C as shown) such that the first finger 108*a* is accommodated within the higher channel 102*b*' of the tool 102', while the second finger 108*b* is accommodated within the lower channel 102*b*" of the other tool 102". Shifting back to FIG. 1, each of these engagements facilitates advantageous securement and seating of the tools 102' and 102". Preferably, this is enhanced by ramped profiles at the finger ends 108*a*', 108*b*' such that the ends still extend into and effectively engage the tangs 102*a*' and 102*a*". As already noted, the insert body 109 would function similarly if alternately used.

As described above, many different types of activation/actuation systems (e.g., hydraulic, pneumatic, electrical, mechanical, or other like means) have been implemented over the years with tool holder designs. In many cases, such systems have resulted in exaggerated complexity and/or cost, particularly if activation needs to be regulated. It should be appreciated that any of these activation/actuation systems could be adapted for use with clamping assemblies including the insert bodies 108/109 embodied herein.

Figure 3A:
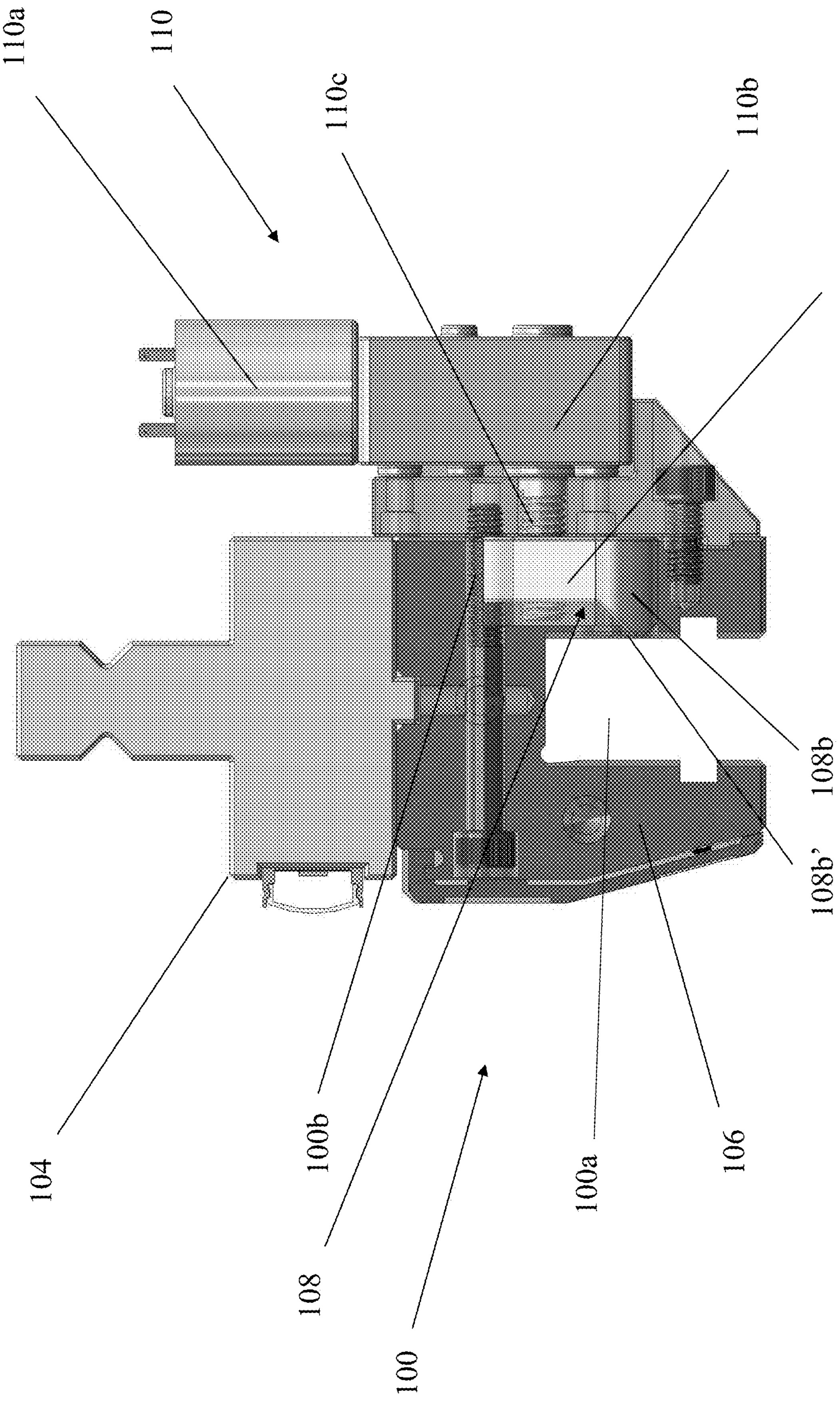
FIG. 3A is a cross sectional view of a tool holder assembly in accordance with certain embodiments of the invention, the holder assembly being shown in open configuration and linked to an exemplary adaptor, with the view taken across lines IIIA-IIIA of FIG. 5A.

In certain embodiments of the present invention, the tool holder assembly 100 is electrically actuated. Turning to FIG. 3A, the tool holder assembly 100 can be integrally constructed with, and configured for activating, a single insert body (e.g., insert body 108 of FIGS. 2A/B as shown, or insert body 109 of FIG. 2C). The tool holder assembly 100 is shown in its unclamped configuration, whereby the fingers 108*a*, 108*b* of the insert body 108 are not extending into the tool channel 100*a*. The electrical activation source or system 110, in certain embodiments, includes a DC type motor 110*a* and gear box 110*b* with an output shaft 110*c*. Such DC motors are well known, often configured with corresponding gearbox as is shown. By their design, the motor is equipped to function at a certain voltage (e.g., 6v, 12v, or 24v) to provide certain RPM, with the gearbox translating such into a prescribed RPM for the output shaft. To that end, the speed and torque on the output shaft 110*c* are dependent on the internal configuration (or ratio) of the gearbox 110*b*. The motor 110*a*, in certain embodiments, has a worm gear that couples to the gear box 110*b*, which is configured to generate rotation of the output shaft 110*c*, which in turn generates the clamping forces necessary to secure and seat tooling via the insert body 108. Exemplary parameters for the embodied configuration, can include a 24v motor with gearbox having ratio of 600:1, such that 6000 RPM of the motor is translated by the gearbox to 10 RPM of the output shaft. It should be appreciated that other motor/gearbox configurations could be alternately used, and the designs noted herein are provided for exemplary purposes. Exemplary manufacturers for obtaining such motor/gearbox products are Fuzhou Bringsmart Intelligent Tech. Co., Ltd. (Fuzhou, China: www.bringsmart.com), Shenzhen Jinshunlaite Motor Co., Ltd. (Shenzen City, China: www.aslongdemortor.com), and Need-for-Power Motor Co., Ltd. (Shenzhen, China: www.nfpmotor.com).

Shifting back to FIGS. 2A/B and 2C and relative to the insert bodies 108 and 109 shown therein, their fingers 108*a*, 108*b* and 109*a*, 109*b* are offset from each other (such as by being spaced apart, diverging, or both), e.g., such that each of the illustrated insert bodies 108 and 109 has a generally triangular shape. With reference to FIG. 1, the fingers 108*a*, 108*b* of the insert body 108 protrude from a base of the body 108, while a top or central region (e.g., an apex or central region) of the body 108 is defined to receive and function with threaded output shaft 110*c* of the electrical system 110. As FIG. 2C shows, the insert body 109 has a similar configuration. In certain embodiments, each insert body 108, 109 is defined with a threaded bore 108*c*, 109*c* and the output shaft 110*c* of the electrical system 110 is correspondingly threaded (e.g., exteriorly threaded) such that the bore 108*c* is configured to threadedly receive the shaft 110*c*.

Preferably, the insert body 108, 109 (or movable portion) is configured such that (a) it moves toward (and into or further into) the tool channel 100_a_ in response to rotation of the output shaft 110_c_ in a first direction, and (b) it moves away from the tool channel 100_a_ in response to rotation of the output shaft 110_c_ in a second direction. The first and second directions are selected from clockwise and counterclockwise.

In certain embodiments, the output shaft 110_c_ can be a single body extending from the gear box 110_b_ into the central bore 108_c_ of the insert body 108 (or central bore 109_c_ of the insert body 109). Alternately, and with reference to FIGS. 2D and 2E (as exemplified with the insert body 109), the output shaft may be designed to involve multiple elements. For example, in certain embodiments as shown, the electrical activation system 110' has a gear box 110_b_' configured with an output shaft 110_c_' comprising male 111_a_ and female 111_b_ portions that mate so as to selectively couple the system 110' to the insert body 109_c_. The male portion 111_a_ of the output shaft, in certain embodiments, has a shape, which mates with a correspondingly shaped aperture 111_c_ defined in female portion 111_b_. In certain embodiments, as shown, the shape can be a multi-point star shape, such as a six-point star shape. Screw drives of such a configuration are sometimes referred to as a star drive. Certain commercial drives of this nature are sold under the tradename Torx. For now, the reader should appreciate that such male/female configuration enables installation and/or replacement of the electrical activation system 110' to be easily and efficiently performed. Further detail regarding such installation/replacement is covered later. In certain embodiments, the female portion 111_b_ is defined with exterior threading to correspondingly mate with interior threading of central bore 109_c_ of the insert body 109 (or central bore 108_c_ of the insert body 108).

Figure 3B:
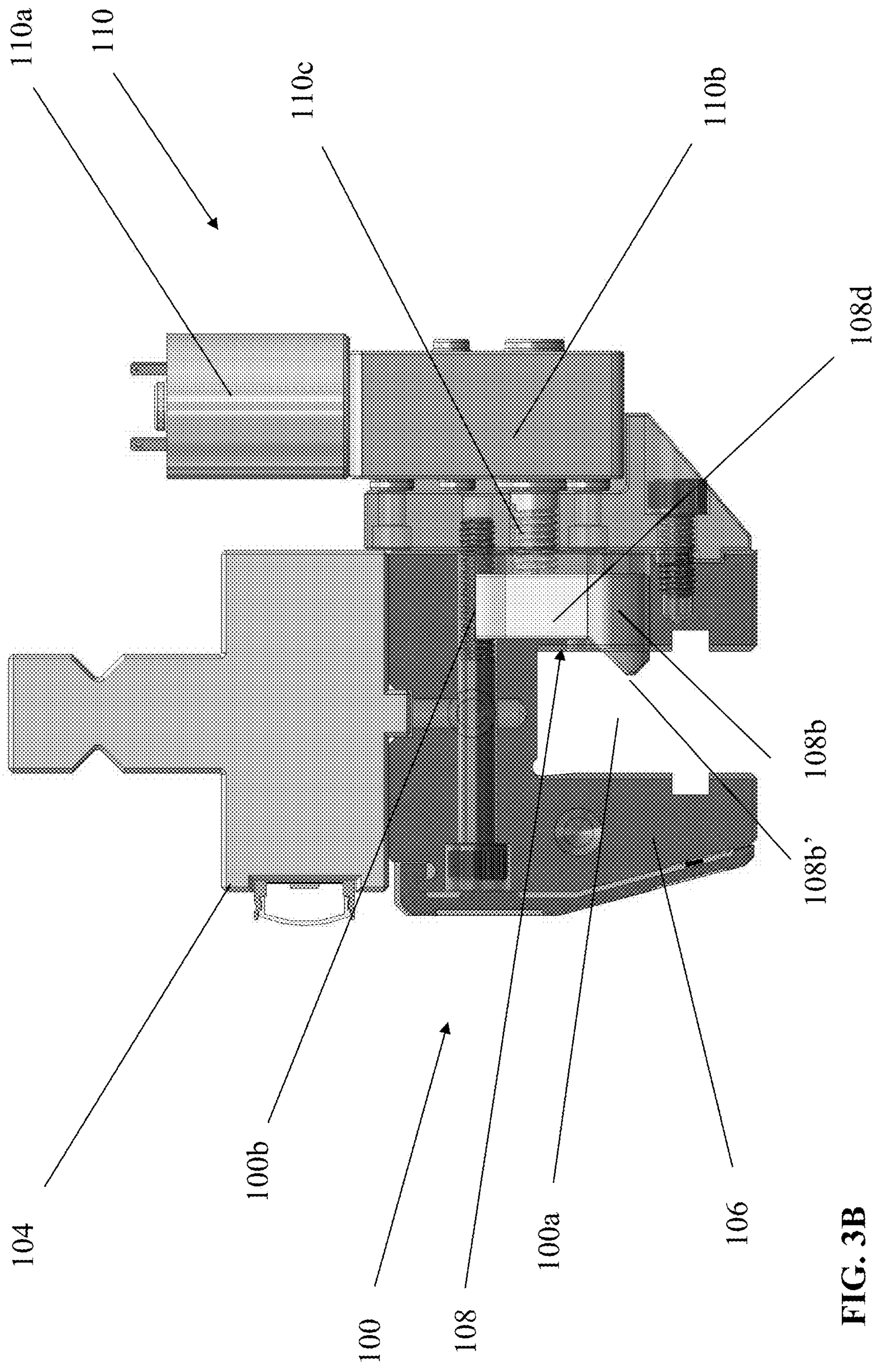
FIG. 3B is an alternate view of the tool holder assembly of FIG. 3A, wherein the holder assembly is shown in closed configuration.
Figure 4:
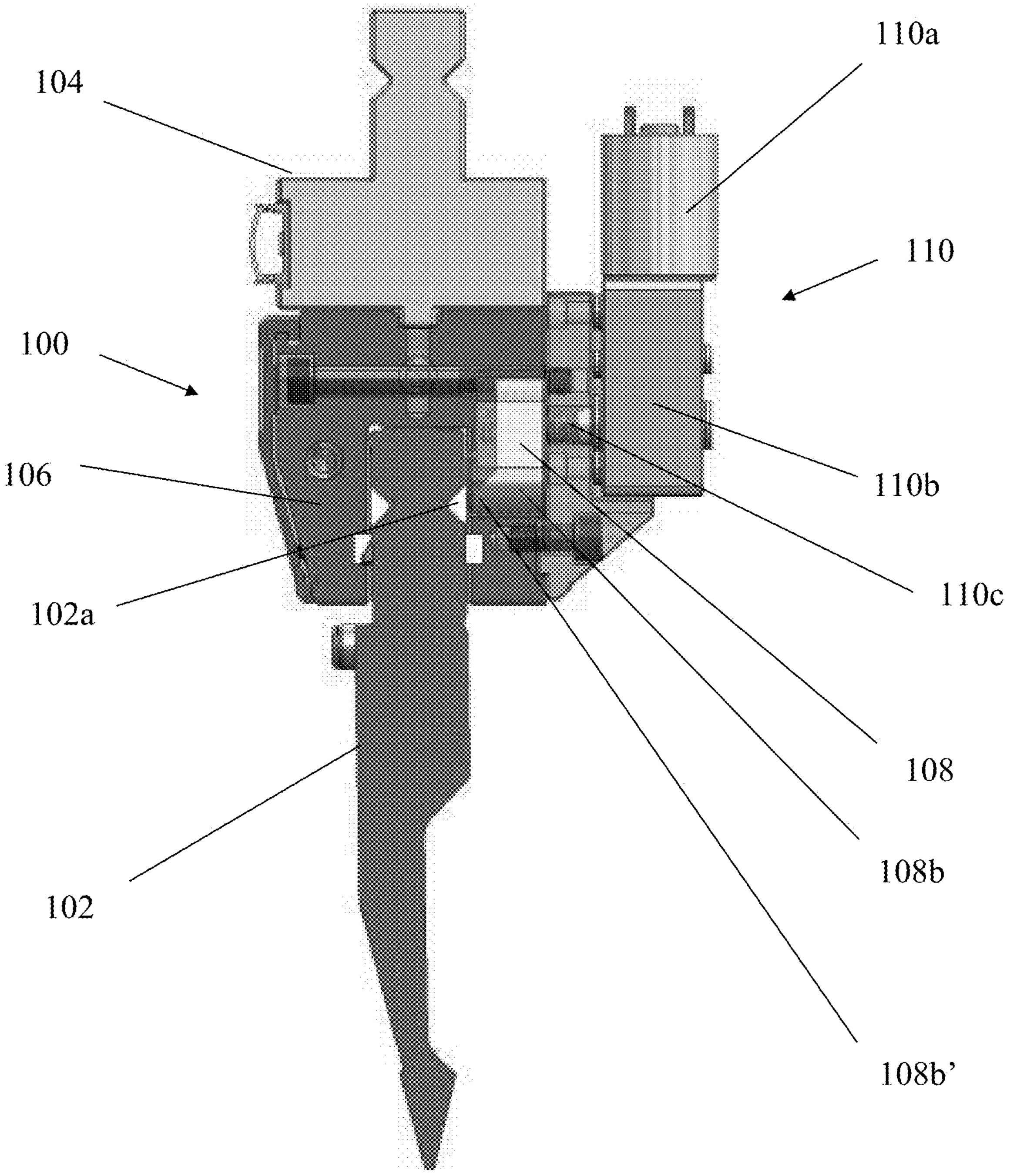
FIG. 4 is an alternate view of the tool holder assembly of FIG. 1, wherein the holder assembly is shown in open configuration.

Turning back to FIG. 3A as well as FIG. 3B, activation of the electrical activation system 110 and corresponding triggering of the insert body 108 are exemplified. While the collective functioning of the system 110 and insert body 108 is detailed herein, it should be appreciated that electrical system 110' and/or insert body 109 could alternatively be used and would function similarly to that noted for system 110 and insert body 108. Upon activation of the electrical system 110 and a resulting rotation of the threaded output shaft 110_c_ within threaded bore 108_c_ of the insert body 108, a corresponding advancement (e.g., movement toward and into or further into channel 100_a_) of the insert body 108 occurs. Such advancement occurs due to the insert body 108 being positioned in pocket 100_b_ of the tool holder 100, which retain the orientation of the insert body 108, yet enable movement of the body 108 along the output shaft 110_c_ when it rotates. To that end, when the electrical system 110 is actuated, the insert body 108 moves in a first direction toward the tool channel 100_a_. Upon advancing the insert body 108 into contact with the tang(s) 102_a_ of the tooling (when tooling is received in the tool cavity 100_a_), such that the fingers 108_a_, 108_b_ engage the tang groove 102_b_, the fingers 108_a_, 108_b_ will be spurred to move from their initial engagement and orientation if not securely engaging/clamping the tool tang 102_a_.

As already described with reference to FIGS. 2A/2B and 2C, the insert bodies 108 and 109 (and correspondingly, their fingers 108_a_, 108_b_ and 109_a_, 109_b_) can rotate relative to the shaft 110_c_ until reaching a secure engagement/clamp orientation, based on the space within the pocket 100_b_. In certain embodiments, each insert body 108/109 has a limited freedom to rotate both clockwise and counterclockwise, such as by no more than 7 degrees, or no more than 6 degrees, e.g., between ½ degree and 5 degrees, or between 1 degree and 5 degrees about its pivot point PP/PP'. Essentially, this rotation or pivoting of the insert bodies 108 and 109 correspondingly pivots their fingers 108_a_, 108_b_ and 109_a_, 109_b_ to take up/fill in the tolerance (variations) relative to the different tools that may be mounted in the tool cavity 100_b_. It should be appreciated that this rotation/pivoting of the insert bodies 108/109 is enabled by a limited amount of tolerance between the outer periphery of the insert body 108/109 and the pocket 100_b_ of the tool assembly 100. The size of such pocket 100_b_ can be varied; however, it should have one or more wall surfaces defined to be proximate to, yet spaced from, side surface(s) of the base portion 108_d_, 109_d_ of the insert body 108, 109. This will permit its general orientation to be maintained when actuated via the output shaft 110_c_. As one alternative to having such a closely configured pocket 100_b_, one can alternatively provide two or more posts, shoulders, or other stops that permit only the desired limited freedom of rotation for the insert body.

Figure 2D:
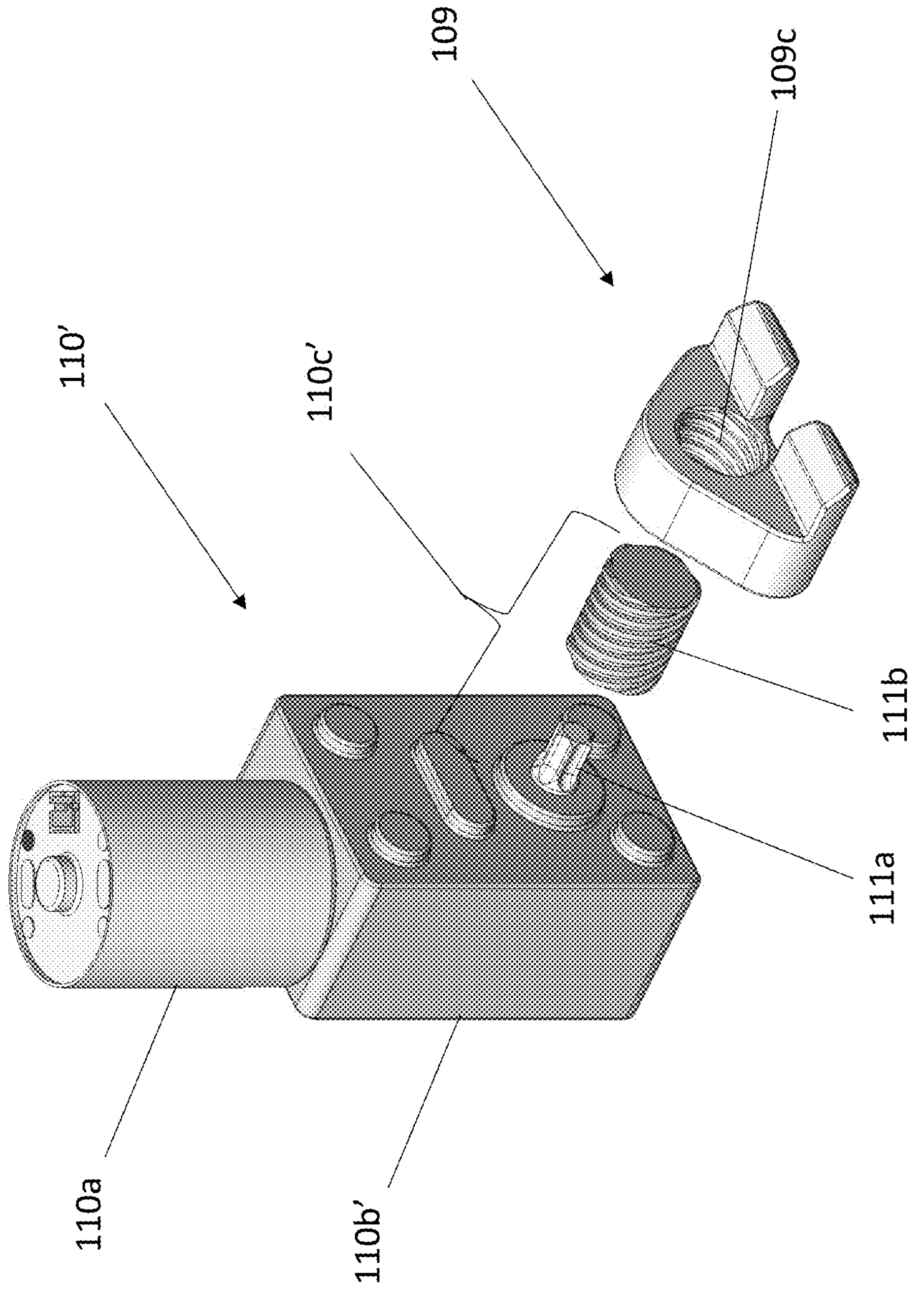
FIG. 2D is a front perspective, partially-exploded view of an electrical activating system and the insert body of FIG. 2C in accordance with certain embodiments of the invention.
Figure 2E:
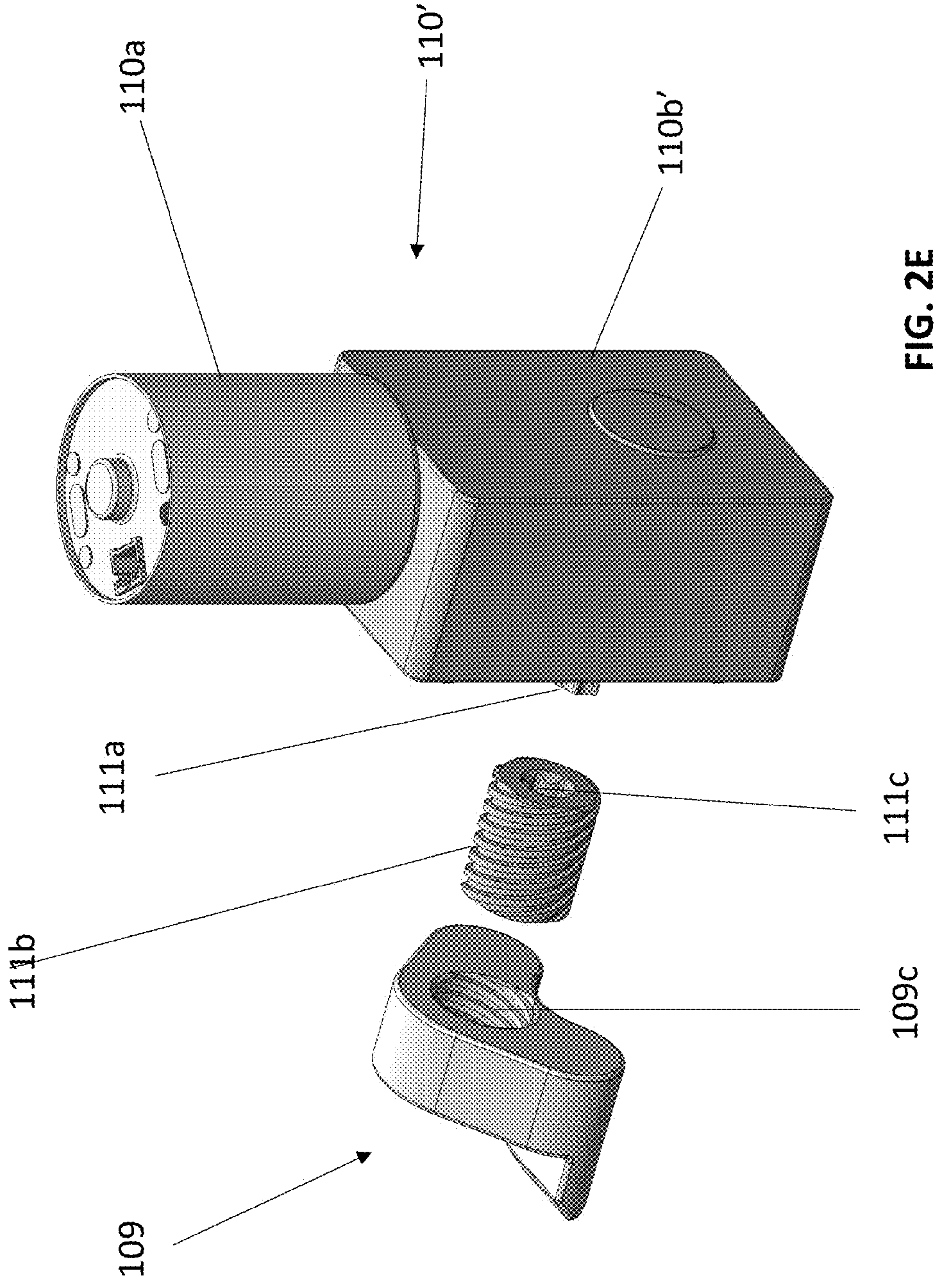
FIG. 2E is a rear perspective, partially-exploded view of the electrical activating system and insert body of FIG. 2D.

Shifting back to FIGS. 2D and 2E, as described above, the electrical activation system 110' is largely similar to the electrical system 110, but for the output shaft 110_c_' involving multiple elements, e.g., male 111_a_ and female 111_b_ portions that are selectively couplable to in turn collectively link to the central bore 109_c_ of the insert body 109_c_. To that end, the female portion 111_b_ can have exterior threading to correspondingly mate with interior threading of central bore 109_c_ of the insert body 109 (or central bore 108_c_ of the insert body 108). In certain embodiments as shown, the exterior threading of the female portion 111_b_ comprises multi-start thread, with such thread converting rotation from the male portion 111_a_ to movement of the insert body 109 in a linear direction (e.g., into the tool cavity of the holder). As should be appreciated, the linear movement of the body 109 is more swift due to the multi-start thread as compared to standard pitch thread. In other embodiments, though, a single thread design can be used.

There are a variety of reasons for the electrical activation system (whether system 110 with single body output shaft 110_c_, or system 110' with multi-element output shaft 110_c_') being used with the tool holder assembly 100. The electrical systems 110, 110' are both efficient and effective in producing the needed clamping forces, particularly compared to other actuating systems. Both systems 110, 110' have limited numbers of components, which can lead to simplified constructions. However, despite the simplicity, large torques can be achieved from the DC motor 110_a_ used with the systems 110, 110', particularly in using a high gear ratio for the motor, as the high ratio corresponds with higher clamping force, as is further described below.

In using the gearbox 110_b_, 110_b_' (with worm gear drive) in combination with such motor 110_a_, the systems 110, 110' exhibit mechanical self-locking of the output shaft 110_c_, 110_c_' when in a first (or "activated") position via the gearing. As such, the insert body 108 or 109, whichever the case may be, is maintained locked in the closed (or "clamped") state, e.g., as shown in FIG. 3B with insert body 108. Such first position represents a locked position for the shaft 110_c_, 110_c_'. Put another way, upon activation via the electrical system 110 or 110' and the resulting securing/seating of the tooling, the threading and gearing of the motor/gear box lock in place, such that it is virtually impossible to move the tooling. Of course, the insert body 108 (or insert body 109) can, when desired, be reversed from its locked position via the system 110 (or system 110'). The mechanical locking enables the clamping force of the electrical system 110 (between 50 lbs-100 lbs) to be lower than is required for other actuation systems, yet just as effective. This locking property of the electrical systems 110, 110' (from the motor/gearing) remains even if power is lost, which is not the case with other actuation systems. Using the electrical activation system 110 or 110' as actuating source enables secure clamping for many applications using less clamping force (than other actuating systems) due to the nature of the mechanical locking properties of the activation system 110. However, in certain applications, more clamping force may be required (for larger sized tooling), and the present electrical activation systems 110, 110' advantageously enable their design elements and parameters to be adaptable for those applications.

Continuing with the above description concerning the electrical activation systems 110 and 110', it should be understood that the larger the clamping force, the slower the clamping speed (which is dictated by the speed of the output shaft 110*c*, 110*c*'). However, this is not a significant disadvantage because, as described above, the electrical activation system 110 can function as needed with lesser clamping force (50 lbs-100 lbs). Preferably, other variables are accounted for in providing for a preferred 50 lbs-100 lbs clamping force. Such variables include the distance the insert body 108 needs to travel to engage/clamp the tool tang 102*a* and how many rotations of the output shaft 110*c* are required for such travel. For example, to achieve 70 lbs-100 lbs clamping force, the time needed to sufficiently rotate the shaft 110*c* is in the range of 5.4 seconds to 7.1 seconds. In certain embodiments, proceeding with a system of 70 lbs clamping force, with the output shaft 110*c* having M8×1.25 pitch, the system requires about 5.4 seconds. Increasing the pitch of the shaft 110*c* and/or decreasing the force to near, yet not below, 50 lbs, enables the insert body 108 to move farther in fewer rotations and/or in less time.

Alternately, in certain embodiments as described above, a multi-start threaded insert can be used as the female portion 111*b*, as depicted with output shaft 110*c*' of FIGS. 2D and 2E, to enable slow rotational speeds of the motor 110*a* to achieve faster clamping times. As noted above, using such a multi-start insert (or helix) as the female portion 111*b* would effectively accelerate the linear motion corresponding to the rotational motion of the shaft 111*a* extending from the gearbox 110*b*'. One example, as noted above, could involve a 600:1 gear ratio for the motor 110*a*, which would generate about 10 rpm. Such 10 rpm motor, when used with a 10 mm pitched 5-start drive screw for the threaded insert serving as the female portion 111*b*, allows for significant clamping force (100 lbs—150 lbs) with an acceptable clamping speed ranging from 2 seconds to 2.5 seconds. By way of comparison, conventional hydraulic systems have tended to exhibit looseness unless high clamping forces (about 250 lbs) are maintained.

Figure 5A:
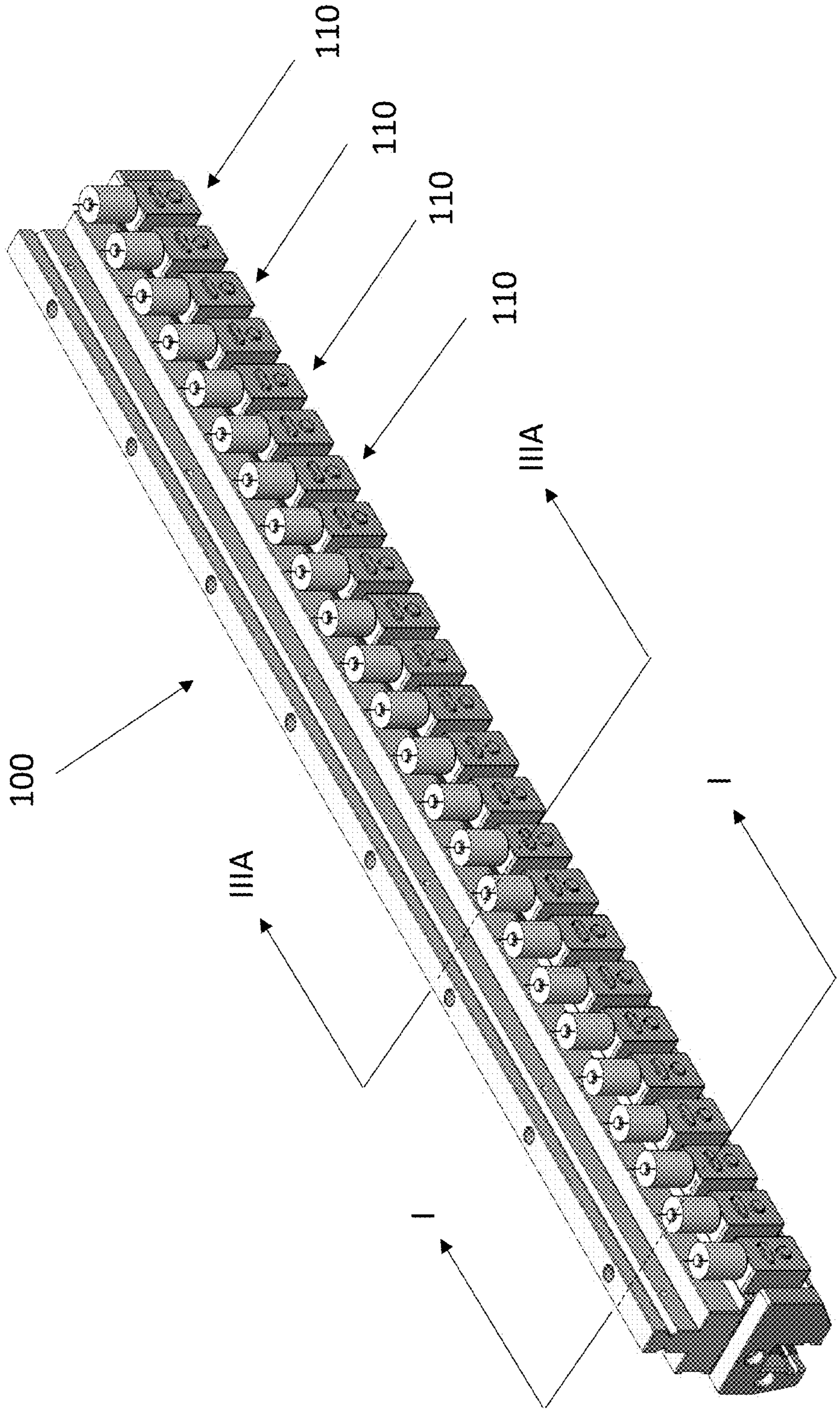
FIG. 5A is a perspective upper rear view of a tool holder assembly arrangement in accordance with certain embodiments of the invention.

As described above, the electrical activation systems 110, 110' have limited numbers of components, making them relatively easy to configure and manipulate. To that end, and with reference to FIG. 1-4, the corresponding components are small enough that the electrical systems 110, 110' can be provided on one side of the holder assembly 100. Furthermore, and with reference to FIGS. 5A and 5B, the components of the electrical system 110 are fairly compact and comparable in width with the underlying insert body 108. As such, in certain embodiments as shown in FIGS. 5A and 5B, a series of integral units each involving a single electrical system 110 being linked with a single insert body 108 (or single system 110' being linked with single body 109, as exemplified in tool holder assembly 300 illustrated in FIGS. 8A and 8B), can be operably linked and connected together, side by side, to form a collective tool holder for one or both of the upper and lower press brake beams (or tables).

Relative to the above-noted concept of integral units, the insert bodies 108 can be grouped together in a modular fashion to account for any beam length, enabling wide variability in terms of new and retrofit applications. With their integral activation/clamping, the tool holder assemblies 100 can be sized to accommodate any quantity of insert bodies 108. For example, as further described below, differing tool holder assembly arrangements are depicted in FIGS. 5A-5D and 6A-6D. To that end, the arrangements share common modules, but have different lengths/different numbers of modules, which can dictate quite a savings relative to shipping. Upon reaching their destination, the tool holder assemblies 100' (see FIG. 6A) can be linked together (to form the desired length/arrangement) to be operably coupled to press brake beam or to form a beam. Once collectively grouped on a press brake beam (or table), any individual or combination of insert bodies 108 and 109 (and their fingers 108*a*, 108*b* and 109*a*, 109*b*) may be used for machining applications along the beam lengths. Again, this flexibility relative to length of tool holder assembly 100 enables product packages to be shipped in much smaller sections, allowing for packaging to be smaller and palletized, rather than crated. By way of comparison, hydraulic beams, which are used in many of the clamping systems sold today, have to be fully assembled at the factory for the length of the press brake table, and then shipped in the standard 8', 10', 12' or even longer lengths.

Figure 5B:
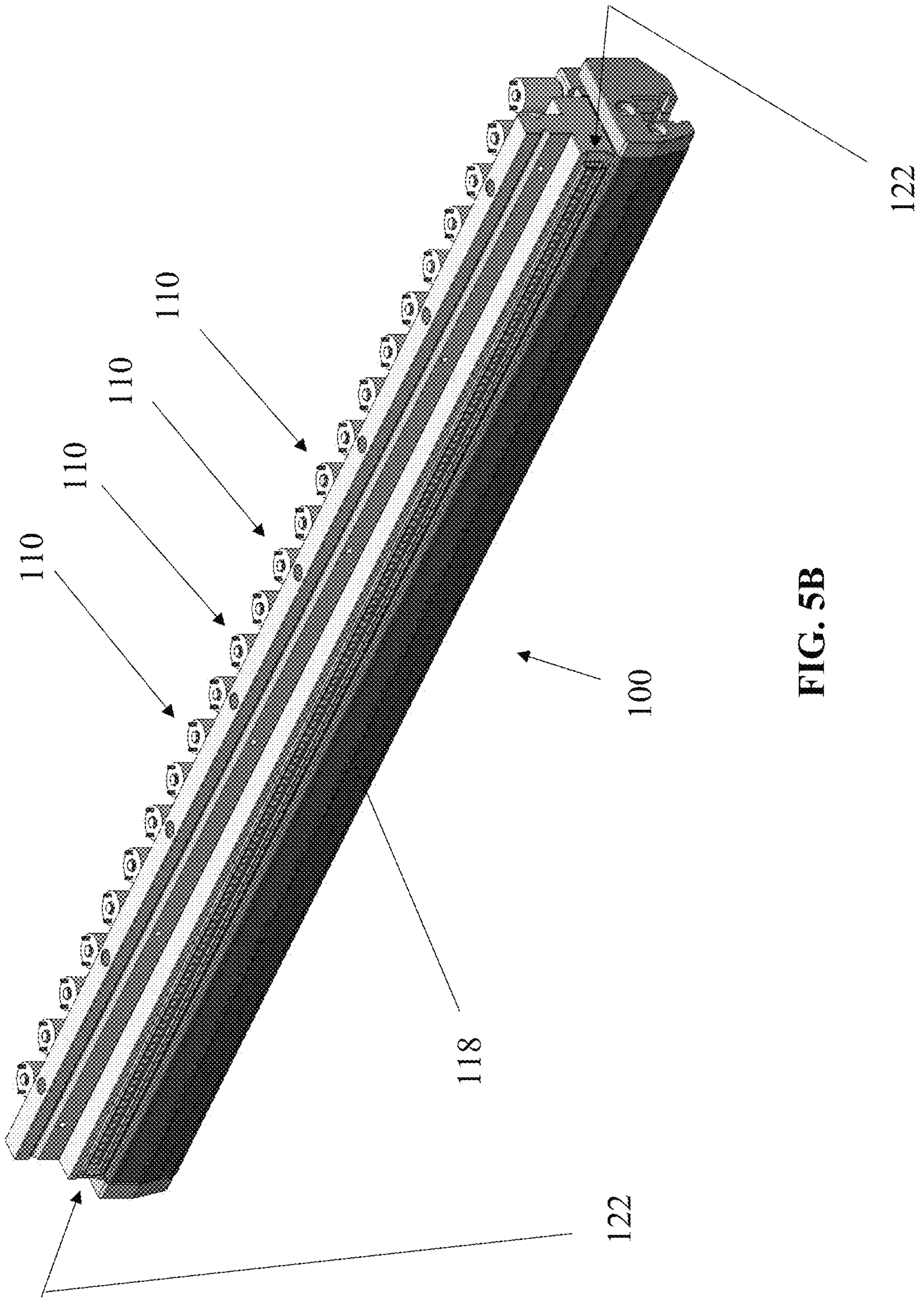
FIG. 5B is a perspective upper front view of the assembly arrangement of FIG. 5A.
Figure 5C:
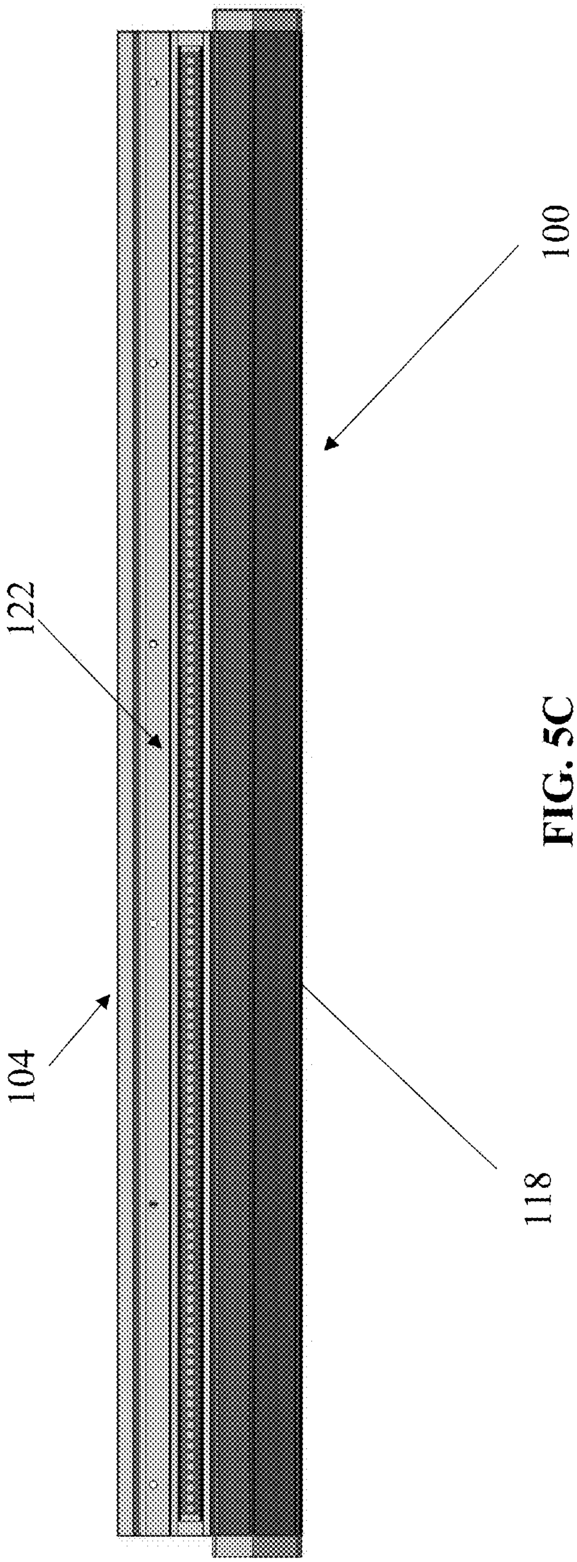
FIG. 5C is a front elevation view of the assembly arrangement of FIG. 5A.
Figure 5D:
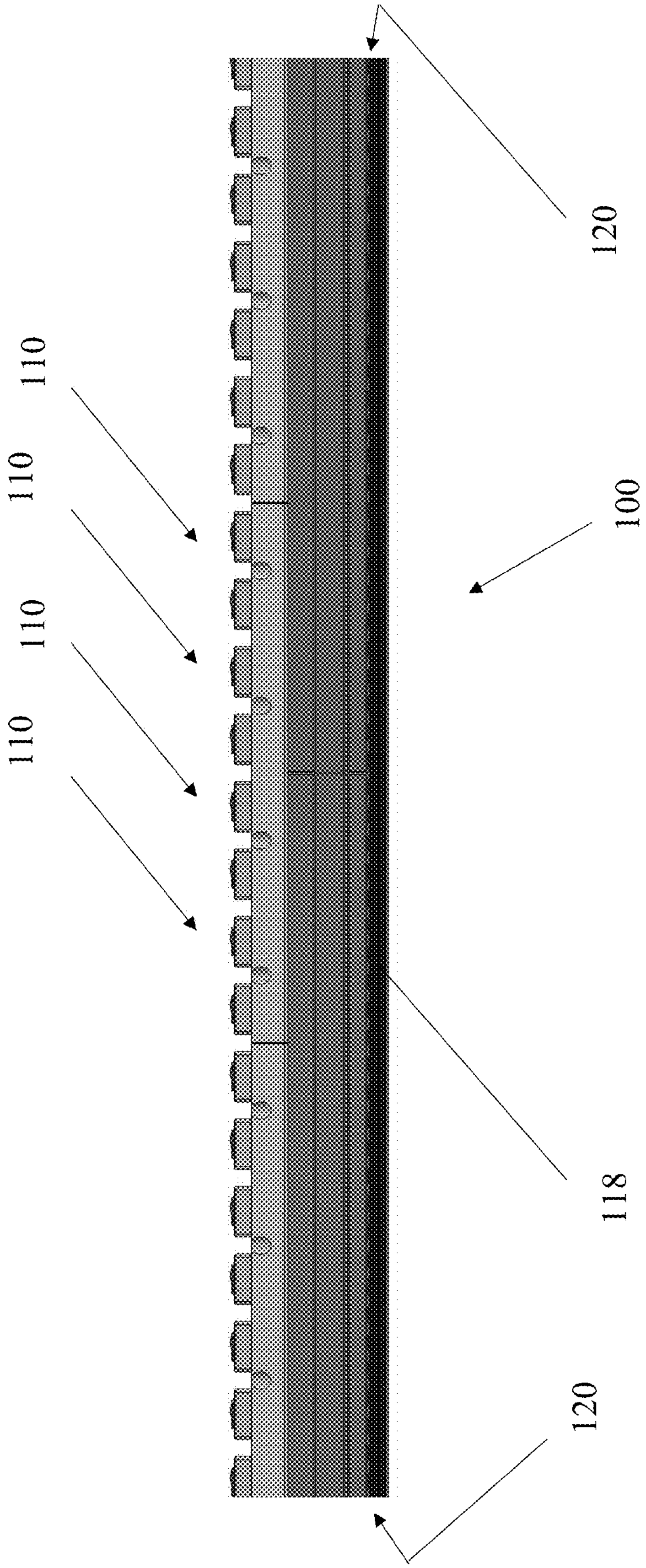
FIG. 5D is a bottom view of the assembly arrangement of FIG. 5A.
Figure 6A:
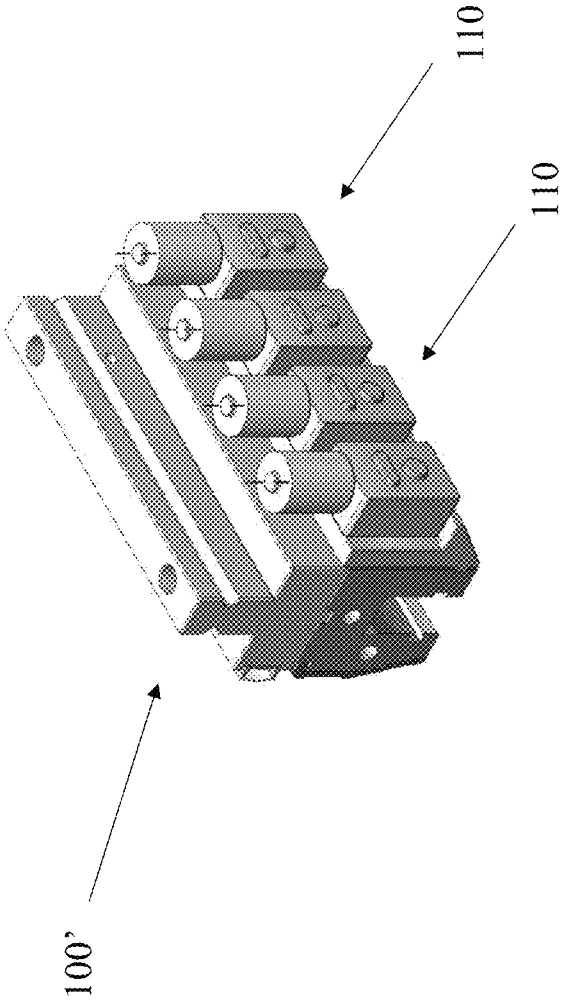
FIG. 6A is a perspective upper rear view of a further tool holder assembly arrangement in accordance with certain embodiments of the invention.
Figure 6B:
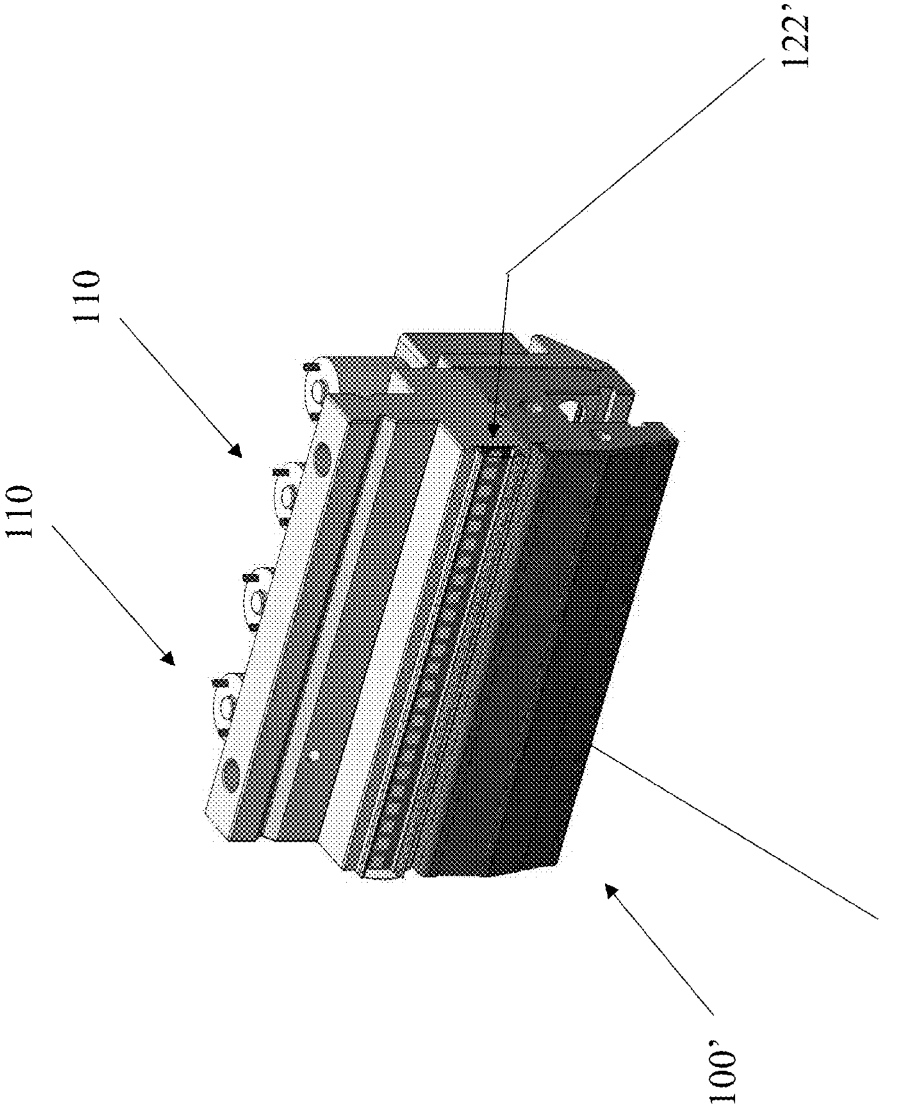
FIG. 6B is a perspective upper front view of the assembly arrangement of FIG. 6A.
Figure 6C:
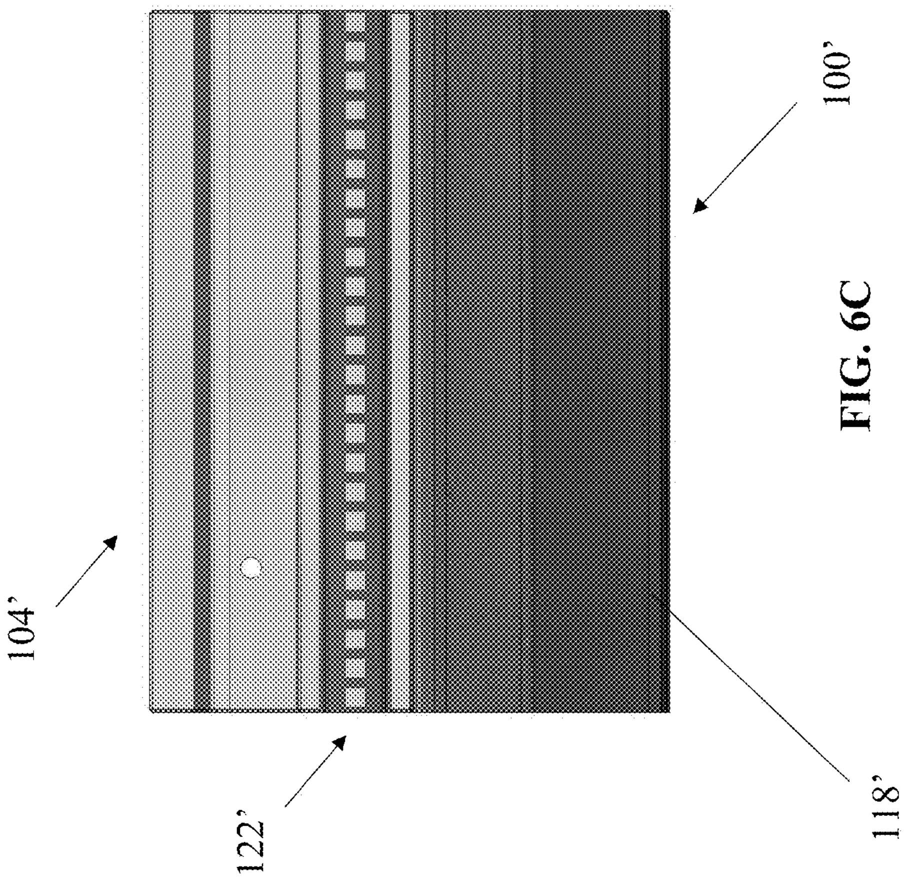
FIG. 6C is a front elevation view of the assembly arrangement of FIG. 6A.
Figure 6D:
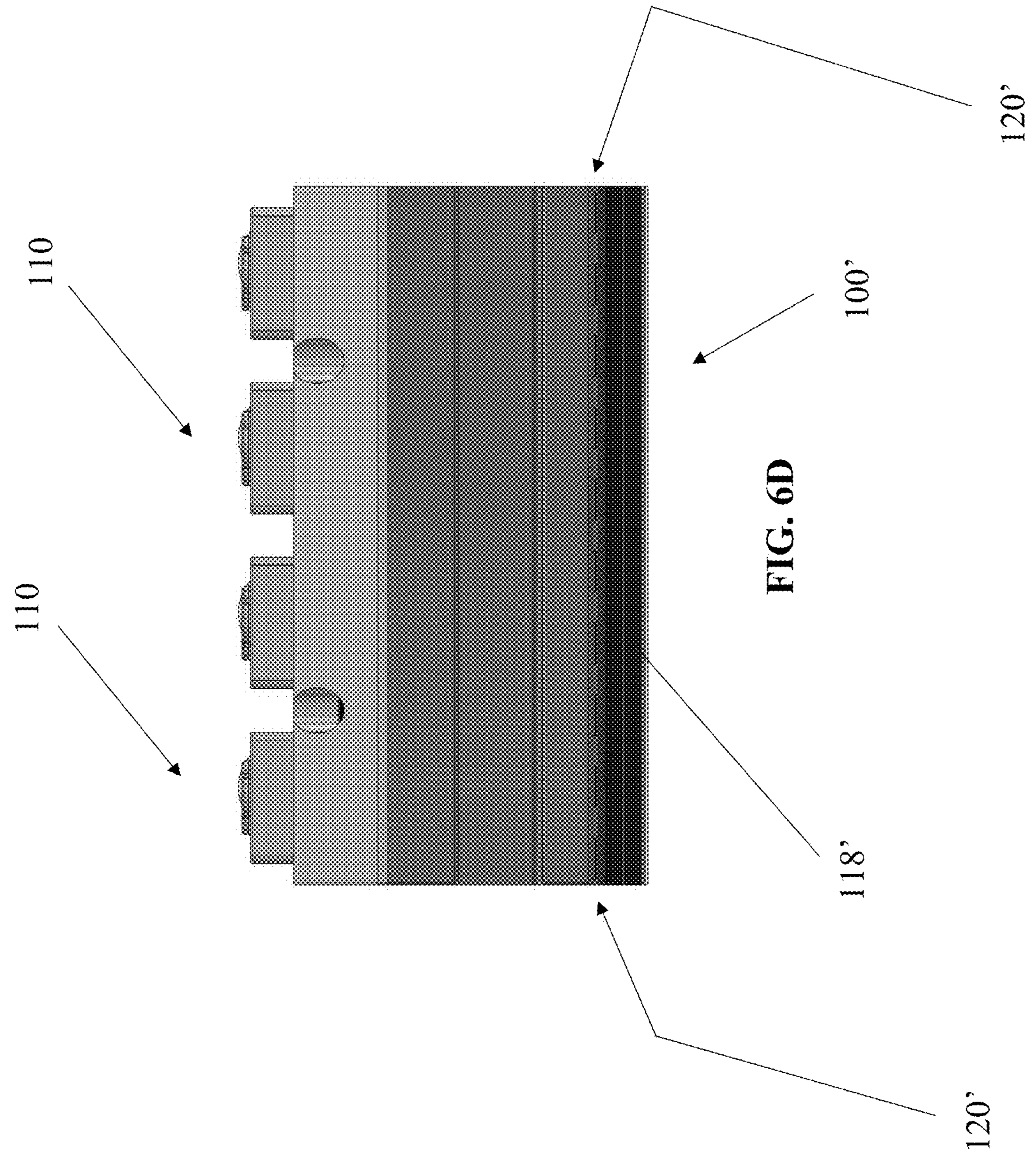
FIG. 6D is a bottom view of the assembly arrangement of FIG. 6A.
Figure 7A:
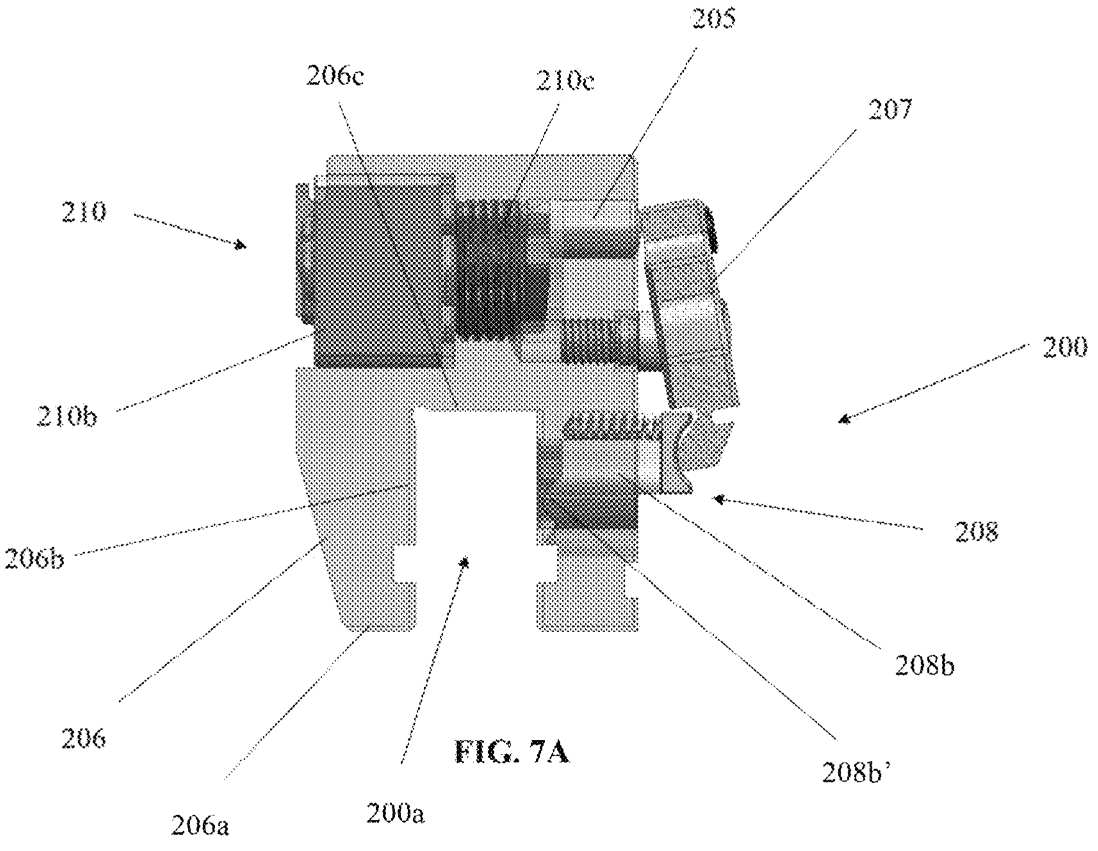
FIG. 7A is a cross sectional view of a further tool holder assembly in accordance with certain embodiments of the invention, the holder assembly being shown in open configuration with the view taken across lines VIIA-VIIA of FIG. 7C.
Figure 7B:
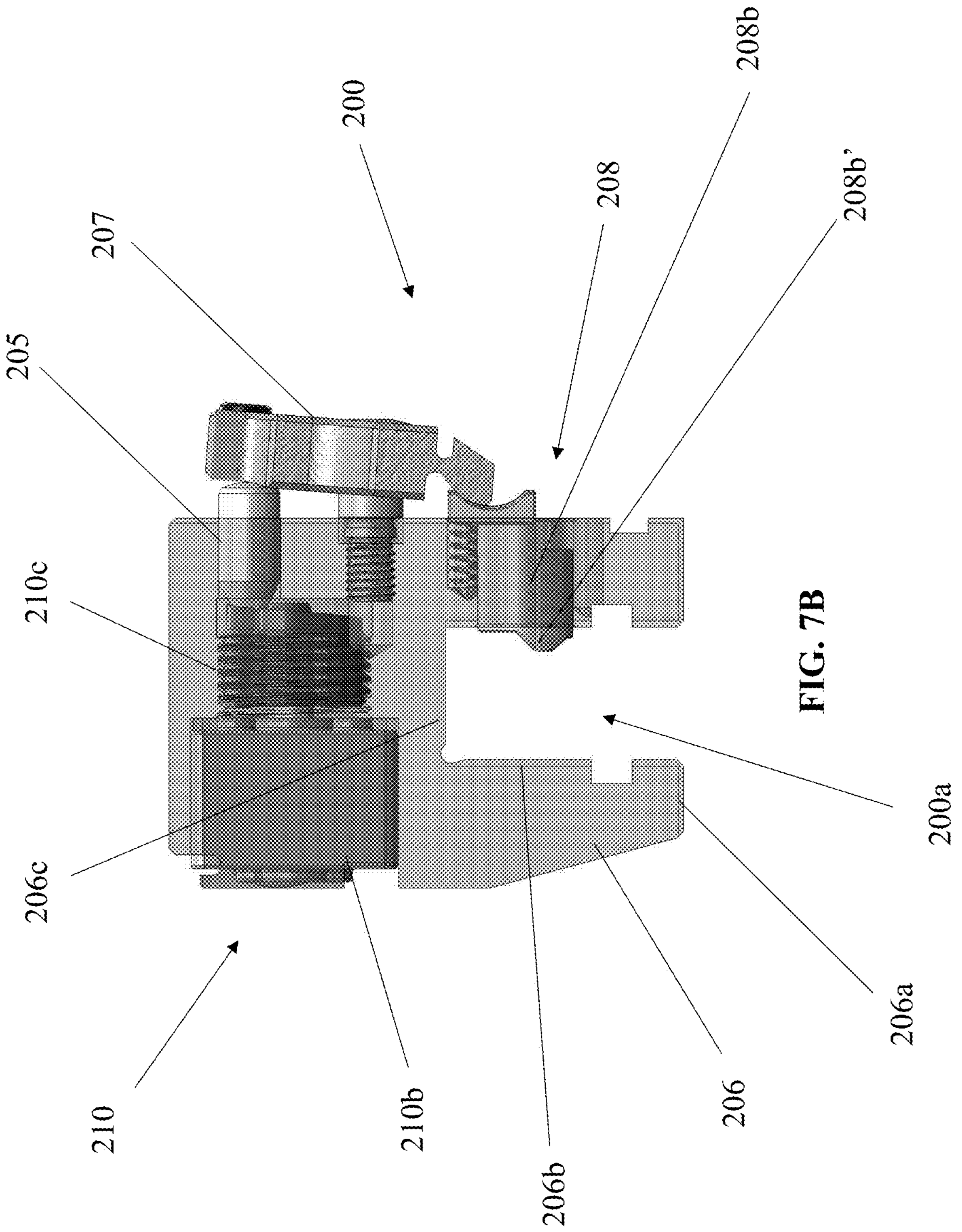
FIG. 7B is an alternate view of the tool holder assembly of FIG. 7A, wherein the holder assembly is shown in closed configuration.
Figure 7C:
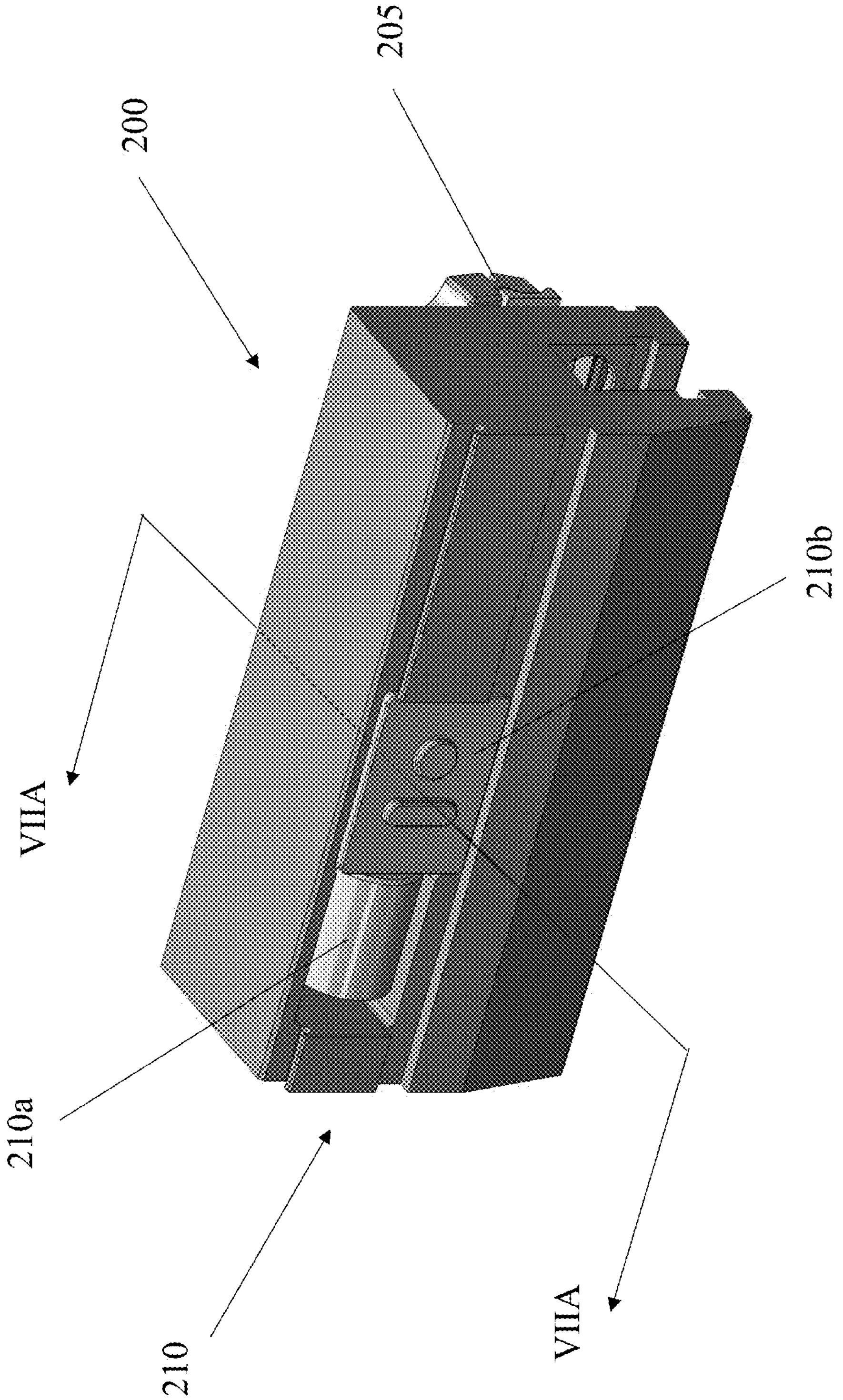
FIG. 7C is a perspective upper rear view of the tool holder assembly of FIG. 7A.
Figure 7D:
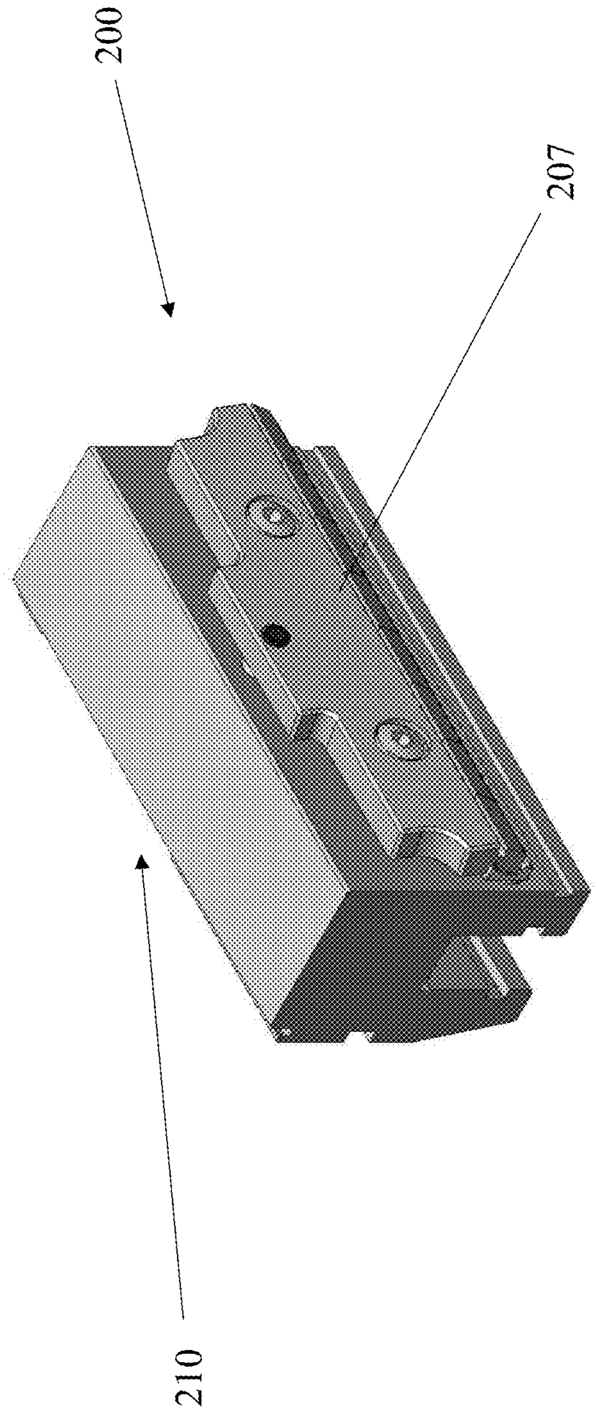
FIG. 7D is a perspective upper front view of the tool holder assembly of FIG. 7A.

With reference to FIGS. 5A-5D, in certain embodiments as shown, the tool holder assembly 100 will include a series of light arrangements. In certain embodiments, the lights will be LED lights. One light arrangement, in certain embodiments with reference to FIG. 5D, can involve ambient down-facing lights 120, e.g., for illuminating the working space. These lights 120, in certain embodiments as shown, can be hidden from general view (e.g., positioned behind the shield 118), yet can be seen from a bottom view of the holder assembly 100 as shown in FIG. 5D. Alternately or in addition, in certain embodiments as shown in FIGS. 5B and 5C, a light arrangement can involve side-facing lights 122, e.g., for signaling functions of the tool holder. In certain embodiments as shown, the lights 122 extend across and above the extent of the holder assembly 100 and can be exemplarily used for showing a state of each holder section. For example, the lights 122 could illuminate a red color above sections of the holder in the unclamped/open state and illuminate a green color above sections of the holder in the clamped/closed state. In certain embodiments, these same lights 122 could be used in addition or alternately for signaling any of a variety of characteristics for the tool holder. For example, they could signal where the next bends should take place for staged bending, e.g., via blinking green color. Further, the lights 122 could be used to signal where to remove a tool, e.g., via blinking red color.

As described above, the tool holder assembly 100 can involve pairings each including a single electrical system 110 with a single insert body 108, and the assembly 100 can be formed with any desired quantity of such pairings. To that end, while FIGS. 5A-5D show an exemplary tool holder assembly 100 having a quantity of twenty-four such pairings, FIGS. 6A-6D show a further exemplary tool holder assembly 100' having a quantity of only four such pairings. In certain embodiments, such an assembly 100' can range from 6" to 8" in length, whereby the cost of shipping a desired number of such lengths would pale in comparison to shipping lengths in the range of from 8' to 12' in length. Effectively, shipping costs would be significantly less because of the small modular sizes of the assemblies 100, 100' that can be shipped. Upon reaching their shipping destination, the tool holder assemblies 100' can be linked together (e.g., to form a longer assembly like that shown in FIGS. 5A-5D) and operably coupled to a press brake beam or to form a beam. Once collectively grouped on a press brake beam (or table), any individual or combination of the insert bodies 108 (and their fingers 108*a*, 108*b*) may be used along the beam extent for machining applications.

In certain embodiments, the electrical activation system 110 can be singular and configured so it is paired (e.g., operably coupled) with a plurality of insert bodies 108. Such an embodiment is exemplified relative to FIGS. 7A-7D, which illustrate a further tool holder assembly 200 in accordance with certain embodiments of the invention. Similar to the tool holder assembly 100' shown in FIGS. 6A-6D, the assembly 200 of FIGS. 7A-7D is of a reduced length. As noted, the assembly 200 is configured with a singular electrical activation system 210, including DC motor 210*a* and gearbox 210*b*, and the output shaft 210*c* is configured to link with a cam 205. In certain embodiments, as shown, the cam 205 is operably coupled with a pivot arm 207 configured to actuate insert body 208. The insert body 208, in certain embodiments, has multiple fingers, similar to that already described relative to insert body 108; however, the insert body could alternately have a single finger.

In use, when the electrical system 210 is activated, the output shaft 210*c* rotates. The distal end of the shaft 210*c* is defined with a ramped channel with which a cam 205 engages. As the shaft 210*c* turns during activation, the channel becomes shallow for the cam 205 (thereby causing a camming action) such that the cam 205 is extended to exert outward force on one end (e.g., a top end) of the pivot arm 207. Such outward force causes the other end (e.g., a bottom end) of the pivot arm 207 to deflect inward and correspondingly provide an inward force on the insert body 208, such that its one or more fingers 208*a*, 208*b* move into the tool channel 200*a* and engage with tooling therein (not shown). In certain embodiments, and as already described with the insert body 108 of FIGS. 1 and 2, the distal ends 208*a'*, 208*b'* have ramped upper surfaces (e.g., angled from horizontal) so they advantageously mate with and exert force on ramped upper surfaces bounding a groove on the tang of the loaded tooling. Thus, activation (and corresponding driving) of the insert body 208 into such tang groove would cause the tooling to initially be secured against side wall 206*b* of stationary portion 206 and further be seated against the lower wall 206*a* and/or upper wall 206*c*, depending on the tooling type.

Configuring the electrical activation system 210 to function with cam 205 as illustrated enables the insert body 208 to be moved faster with a slower moving gearbox 210*b*. To that end, the cam 205 is designed to move the insert body 208 the requisite distance for securement/seating of tooling (loaded within tool channel 200*a*), rather than further needing the motor 210*a* to turn additional times based on the thread pitch, as is the case with the system 110 of FIGS. 5A-5D. As described above, the distance that the cam 205 is moved (via rotation of the output shaft 210*c*) corresponds with the distance the insert body 208 moves (via pivot arm 207). In certain embodiments, the distances that the cam 205 and the insert body 208 move can be related on a 1:1 ratio. However, the invention is not so limited. Particularly, this ratio can be varied as desired (e.g., via variations made to the pivot arm 207, as just one example) to produce a lever effect so as to correspondingly increase or decrease clamping force output by the motor gearbox.

Building on the concepts detailed with reference to FIGS. 6A-6D, FIGS. 8A-8B illustrate a tool holder assembly 300 of specified extent in accordance with certain embodiments of the invention. Particularly, as shown, the assembly 300 is configured with four pairings (or four "modules") each including a single electrical system 110' with a single insert body 109. As should be recognized, the holder assembly 300 shares similarities with the assembly 100' of FIGS. 6A-6D, in that there are four pairings. However, the assembly 300 differs as it is formed to be encased or encapsulated. To that end, the overall length of the assembly 300 and/or the spacing between fingers 109*a*, 109*b* of the insert bodies 109 can be established/standard parameters. For example, in certain embodiments, the length of the assembly 300 can range from 100 mm to 200 mm. In more preferable embodiments, the assembly 300 can range in length from 150 mm to 170 mm. Regarding the spacing between fingers 109*a*, 109*b* of the insert bodies 109, this would be somewhat dependent on the length of the assembly 300. In certain embodiments, the spacing can range in length from 0 mm to 50 mm. In more preferable embodiments, the spacing can range in length from 10 mm to 40 mm; in even more preferable embodiments, the spacing can range in length from 20 mm to 30 mm; and in preferred embodiments, the spacing can range in length between 20 mm and 25 mm.

Relative to the advantageous concept of modular units, the assemblies 300 can be grouped together to account for any beam length, enabling wide variability in terms of new and retrofit applications. As a result, a savings in shipping can be realized. For example, upon reaching their destination, the tool holder assemblies 300 can be linked together (to form the desired length/arrangement) to be operably coupled to press brake beam. Once collectively grouped on a press brake beam (or table), any individual or combination of insert bodies 109 (and their fingers 109*a*, 109*b*) may be used for machining applications along the beam lengths. This flexibility relative to length of tool holder assembly enables product packages to be shipped in much smaller sections, allowing for packaging to be smaller and palletized, rather than crated. These assemblies can be greatly reduced in size, compared to hydraulic beams, which have to be fully assembled and then shipped in the standard 8', 10', 12' or even longer lengths.

Figure 8A:
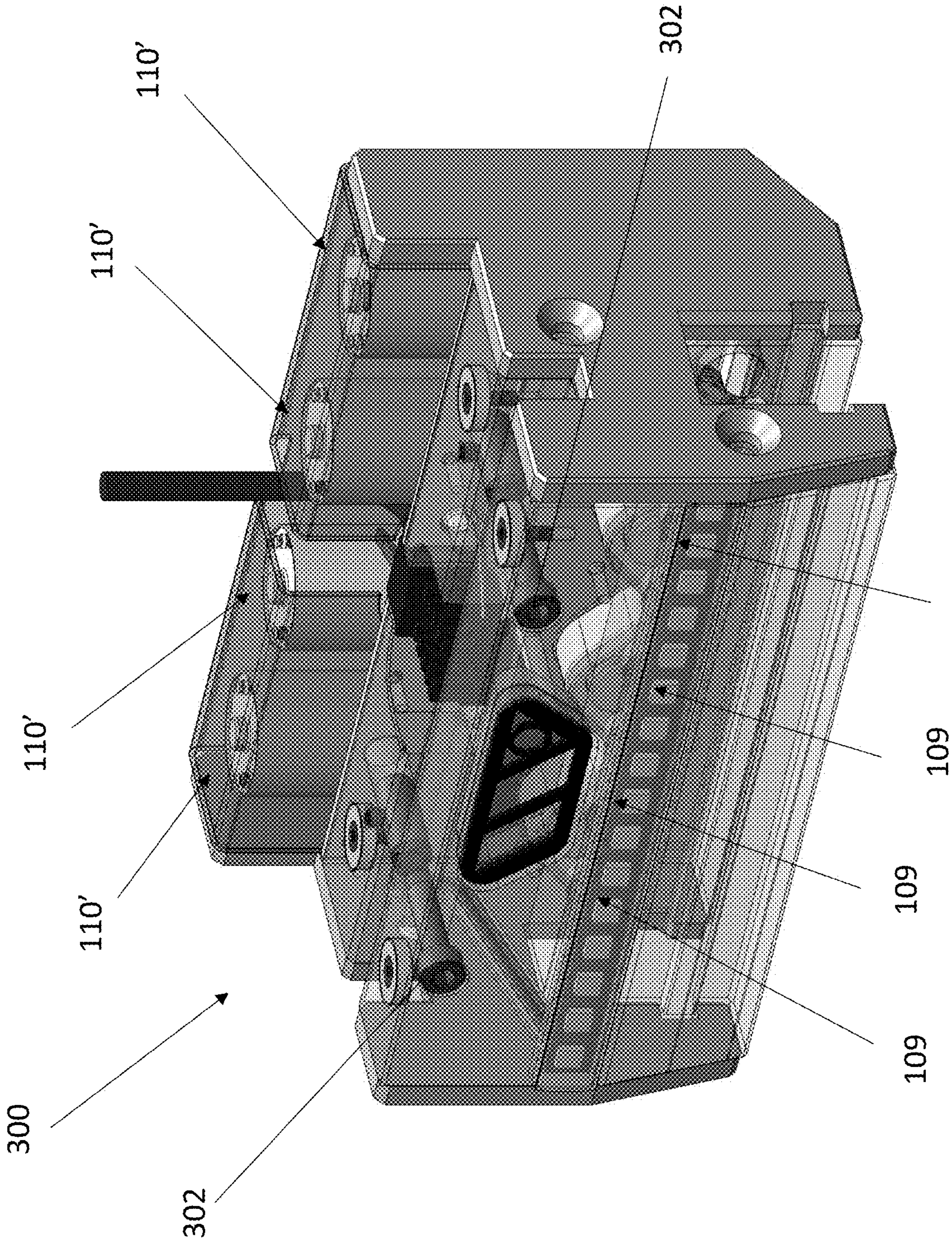
FIG. 8A is a front perspective view of another tool holder assembly in accordance with certain embodiments of the invention.
Figure 8B:
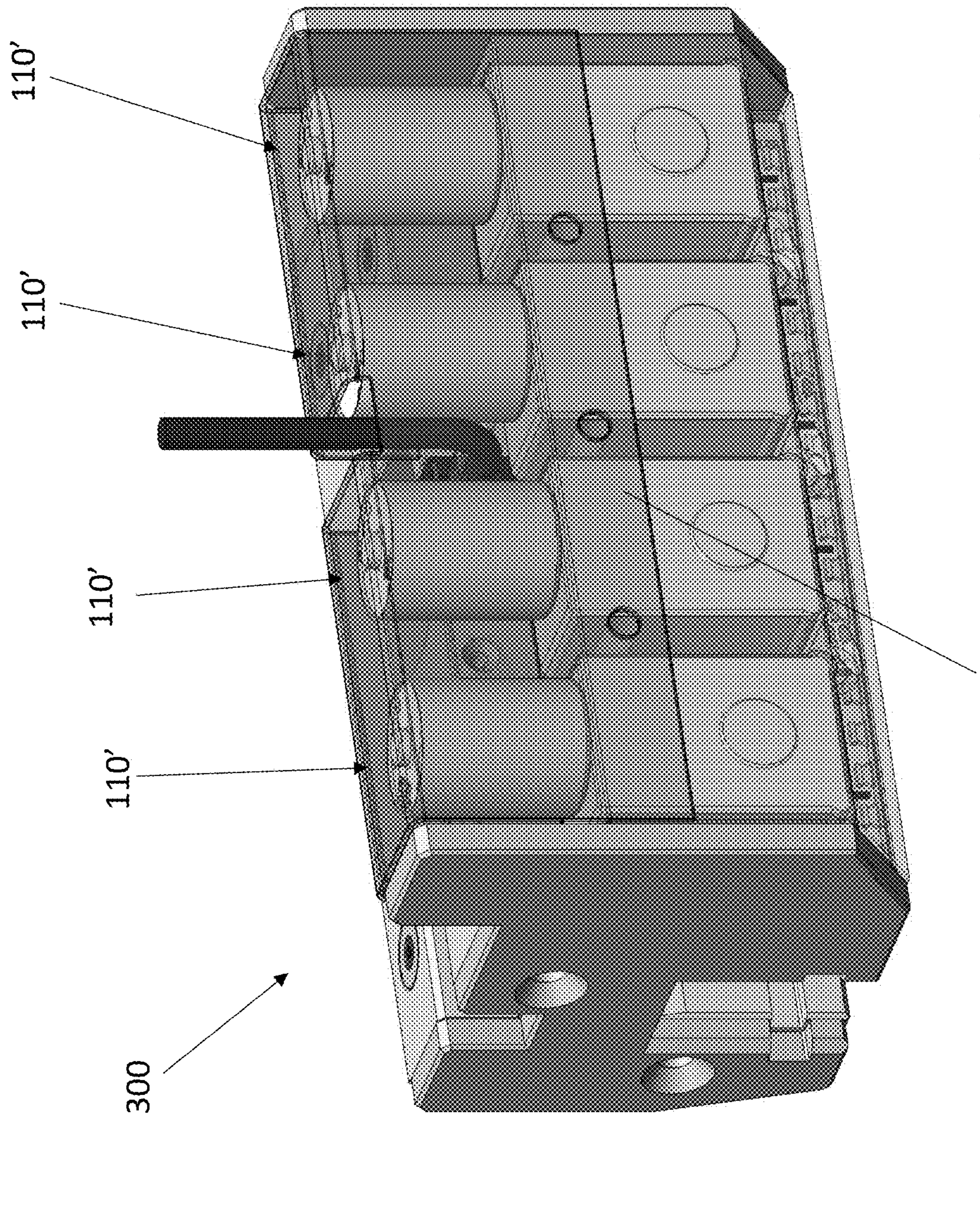
FIG. 8B is a rear perspective view of the tool holder assembly of FIG. 8A.
Figure 9:
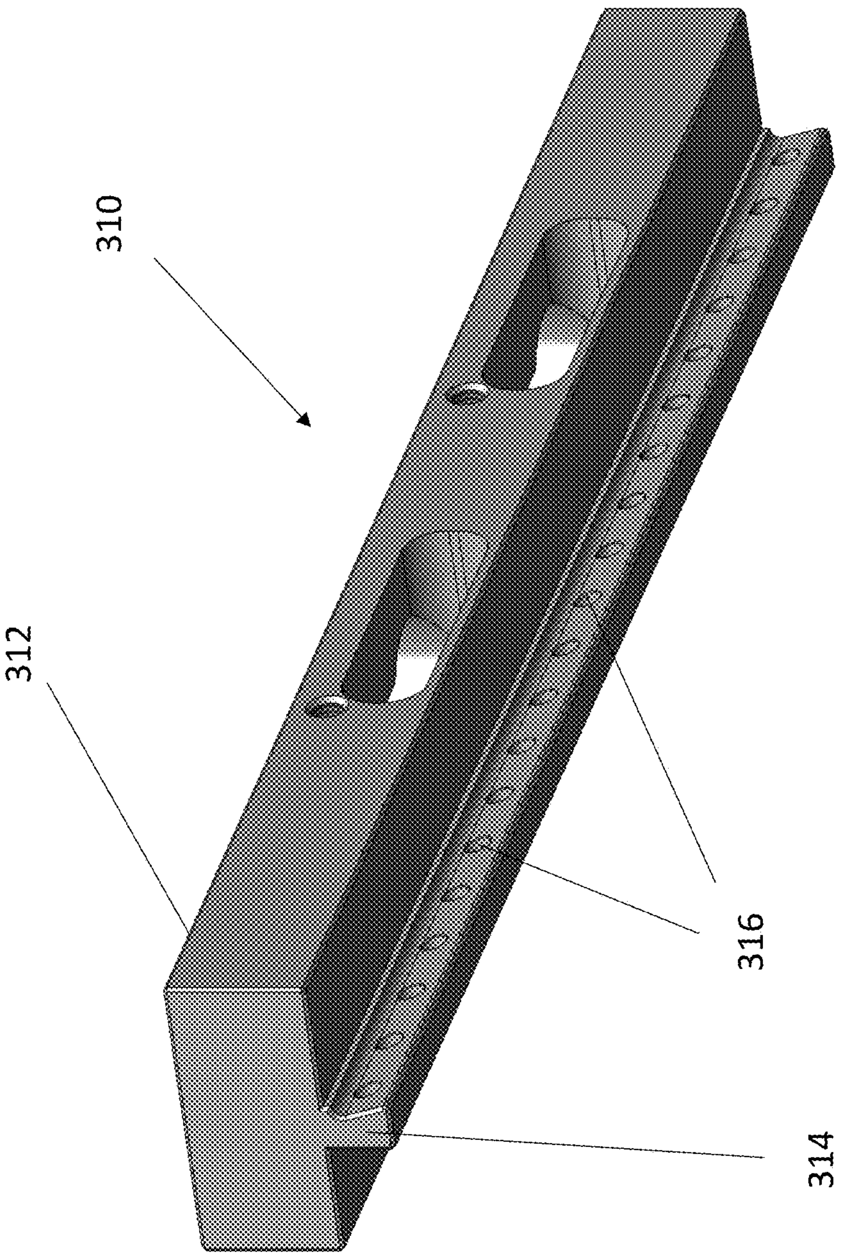
FIG. 9 is a front perspective view of an exemplary beam adaptor in accordance with certain embodiments of the invention.
Figure 10A:
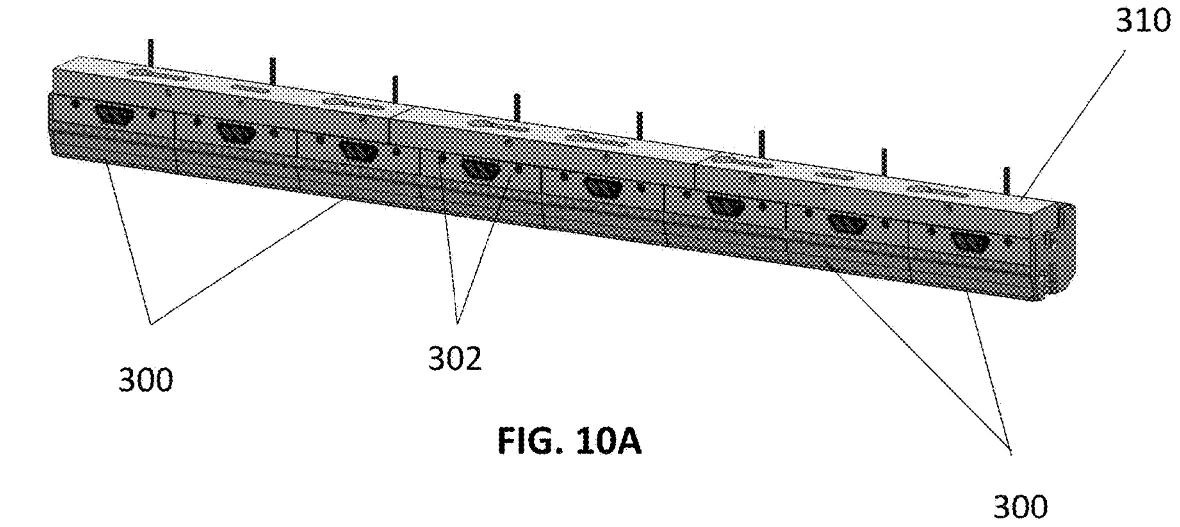
FIGS. 10A and 10B are front perspective views of exemplary mounting configurations for groupings of the tool holder assembly of FIG. 8A as mounted on the beam adaptor of FIG. 9 in accordance with certain embodiments of the invention.
Figure 10B:
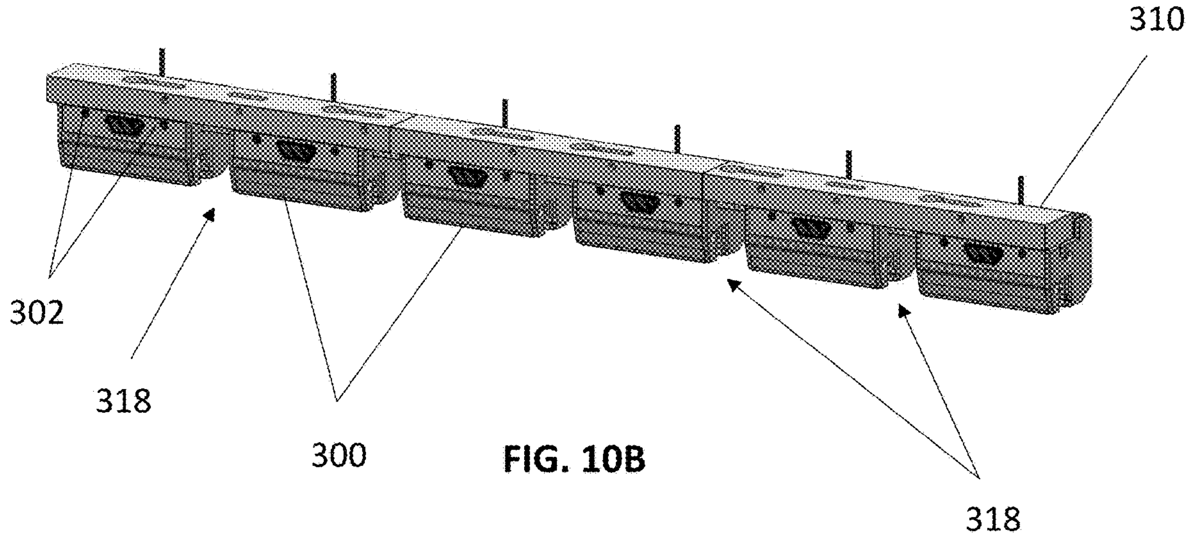

Shifting to FIG. 9, a beam adaptor 310 is illustrated, which, in certain embodiments, is configured to function with the modular tool holder assemblies 300 of FIG. 8A. To that end, the adaptor 310 is used to mount to a specific OEM mounting option (Euro style Z1 or Z2, UBP, etc.) and can be formed to have any applicable length. In use, the upper surface 312 of the adaptor 310 is attached to an upper (or lower) beam of a press brake, and one or more assemblies 300 can be attached to adaptor 310 via the mounting bar 314. As shown, the bar 314 is defined with a series of mounting holes 316 located at spaced-apart positions along its length. Shifting back to FIG. 8A, each assembly 300 is configured with one or more (e.g., a pair of) mounting fasteners (e.g., threaded fasteners, such as bolts or screws) 302, which are located/spaced so as align with the hole spacing of the mounting bar 314. Accordingly, the tool holder assemblies 300 can be mounted to the adaptor 310 as warranted. To that end, FIGS. 10A and 10B illustrate tight and spaced-apart arrangements of such assemblies 300, respectively. Relative to the spaces 318 shown between the assemblies 300 in FIG.

10B, it should be appreciated that the spacing can be varied as needed to provide the warranted tool holder set-up.

From the mounting configurations illustrated via FIGS. 10A-10B, a few advantages should be realized. For example, in the event of a damaged section, that section alone can simply be replaced by removing its fastener(s) 302 and pulling the damaged section from the beam adapter 310, while unplugging the supply cable. Steps for doing so may take about 5-10 minutes, compared to days or weeks relative to a service call for a broken solid beam. Also, in the event of a damaged section, the remainder of the holder assemblies 300 continue to function, as compared to an entire beam being potentially unusable until a repair is made relative to one outage area along the beam.

As alluded to relative to FIGS. 2C and 2D, the use of male 111*a* and female 111*b* portions for the output shaft 110*c*' of the electrical activation system 110' enables those portions to be easily pulled apart as needed for maintenance or repair to the electrical system 110'. Furthermore, in some embodiments, the motors 110*a* can be replaced simply by removing screws on the back of the assembly 300, removing a back cover 304, unplugging the motor 310*a* and sliding the male portion 111*a* out from its linkage to the female portion 111*b*, thereby freeing the electrical system 110' for removal. In some preferred embodiments, those steps would only take about 5-10 minutes, compared to days or weeks relative to a service call for a broken solid beam. Also, in the event of a motor failure, the remainder of the holder assembly 300 would continue to function, as compared to a solid beam bladder failure where the entire beam is unusable until repaired.

Thus, embodiments of a TOOL HOLDER ASSEMBLY, AND SEATING/SECURING COMPONENTS AND ACTIVATION SYSTEMS THEREFOR are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A tool holder assembly comprising:

a stationary portion having a vertical side wall that partially defines a tool channel;

a movable portion situated opposite the vertical side wall of the stationary portion; and an electrical activation system to which the movable portion is operatively linked;

wherein the electrical activation system includes an output shaft that is movable upon activation of the system and when moved results in corresponding movement of the movable portion, the electrical activation system comprising a motor and gearbox from which the output shaft extends;

wherein the output shaft comprises male and female portions that are collectively linked to the movable portion.

2. The tool assembly of claim 1 wherein the corresponding movement of the movable portion is in a first direction relative to the tool channel and results in locked engagement with tooling when loaded in the channel, wherein the output shaft upon the activation of the system reaches a first position, the first position representing a locked position for the output shaft and a corresponding locked position for the movable portion due to the motor and gearbox, wherein said locked position and said corresponding locked position are maintained even during a loss power to the electrical activation system.

3. The tool holder assembly of claim 2 wherein upon contact between the movable portion and the tooling when loaded in the tool channel, the movable portion is configured to shift in a second direction to a new orientation relative to the tooling in the event a better engagement between the moveable portion and the tooling can be achieved, wherein movement of the movable portion in the second direction stops at the new orientation when the movable portion becomes engagingly locked with the tooling.

4. The tool holder assembly of claim 3 wherein the movable portion is threadably linked to the output shaft, the output shaft is movable by rotation upon activation of the electrical activation system, such rotation resulting in the movable portion rotating in the second direction relative to the output shaft.

5. The tool holder assembly of claim 3 wherein the movable portion has multiple fingers, the fingers protruding from the movable portion such that the fingers engage with the tooling when loaded in the channel during movement of the moveable portion in the first direction.

6. The tool holder assembly of claim 5 wherein the multiple fingers are two fingers, the two fingers being offset, such that the fingers are adapted to contact and engage at one or more of different points and along differing axes on the tooling when loaded in the tool channel.

7. The tool holder assembly of claim 6 wherein midlines of the two fingers are angularly separated relative to a pivot point of the movable portion by an angle of between 75° and 105°.

8. The tool holder assembly of claim 2 wherein the output shaft is movable by rotation.

9. The tool holder assembly of claim 8 wherein the output shaft is linked to a cam such that a rotation of the output shaft causes movement of the cam in a second direction, the second direction being opposite to the first direction.

10. The tool holder assembly of claim 8 wherein the tool holder assembly is configured such that a distance moved by the cam in the second direction is equal to a resulting distance moved by the movable portion in the first direction.

11. The tool holder assembly of claim 8 wherein the cam and the movable portion are operably linked via a pivot arm.

12. The tool holder assembly of claim 2 wherein the electrical activation system is situated opposite the vertical side wall of the stationary portion.

13. The tool holder assembly of claim 2 wherein the electrical activation system comprises a plurality of electrical activation systems and the movable portion comprises a plurality of movable portions, wherein each of the electrical activation systems is linked to a corresponding one of the movable portions.

14. The tool holder assembly of claim 2 wherein the movable portion comprises a plurality of movable portions, and the electrical activation system is linked to each of the movable portions.

15. The tool holder assembly of claim 2 further comprising two or more lighting arrangements, a first of the lighting arrangements being hidden from view and positioned to illuminate machining areas adjacent to the tool channel, a second of the lighting arrangements positioned on an outer surface of the assembly and extending along a longitudinal extent of the stationary portion to signal statuses relative to one or more of current use of the movable portion and scheduled machining operations for the movable portion.

16. The tool holder assembly of claim 1 wherein the male portion has a multi-point star shape.

17. The tool holder assembly of claim 1 wherein the female portion has exterior threading to correspondingly mate with an interiorly-threaded bore of the movable portion.

18. The tool holder assembly of claim 17 wherein the outer threading comprises multi-start thread, the multi-start thread converting rotation from the male portion to movement of the movable portion in a linear direction.

19. A tool holder assembly comprising:
- a stationary portion having a vertical side wall that partially defines a tool channel;
- a movable portion situated opposite the vertical side wall of the stationary portion; and
- an activation system to which the movable portion is operatively linked;
- wherein the activation system includes an output shaft that is movable upon activation of the system and when moved results in movement of the movable portion in a first direction toward the tool channel to secure tooling when loaded within the tool channel;
- wherein upon contact between the movable portion and the tooling when loaded in the tool channel, the movable portion is configured to shift in a second direction to a new orientation relative to the tooling in the event a better engagement between the moveable portion and the tooling can be achieved, wherein movement of the movable portion in the second direction stops at the new orientation when the movable portion becomes engagingly locked with the tooling; and
- wherein the movable portion is threadably linked to the output shaft, the output shaft is movable by rotation upon activation of the activation system and via such rotation the movable portion rotates in the second direction relative to the output shaft.

20. The tool holder assembly of claim 19 wherein the movable portion has multiple fingers, the fingers protruding from the movable portion such that the fingers engage with the tooling when loaded in the channel during the movement of the moveable portion in the first direction.

21. The tool holder assembly of claim 20 wherein the multiple fingers are two fingers, the two fingers being offset, such that the fingers are adapted to contact and engage at one or more of different points and along differing axes on the tooling when loaded in the tool channel.

22. The tool holder assembly of claim 19 wherein the activation system is an electrical activation system.

23. The tool holder assembly of claim 22 wherein the electrical activation system comprises a plurality of electrical activation systems and the movable portion comprises a plurality of movable portions, wherein each of the electrical activation systems is linked to a corresponding one of the movable portions.

24. The tool holder assembly of claim 22 wherein the electrical activation system comprises a motor and a gearbox from which the output shaft extends.

25. The tool holder assembly of claim 19 wherein the output shaft comprises male and female portions that are collectively linked to the movable portion.

26. The tool holder assembly of claim 25 wherein the female portion has outer threading to correspondingly mate with an interiorly-threaded bore of the movable portion.

27. The tool holder assembly of claim 26 wherein the exterior threading comprises multi-start thread, the multi-start thread converting rotation from the male portion to movement of the movable portion in a linear direction.

28. A tool holder assembly comprising:
- a stationary portion having a vertical side wall that bounds a tool channel;
- a movable portion situated opposite the vertical side wall of the stationary portion, the moveable portion comprising a body that includes a base portion and two offset fingers, the two offset fingers projecting outwardly from the base portion toward the tool channel, the base portion of the body having formed therein an interiorly-threaded opening; and
- an activation system operatively linked to the movable portion by an exteriorly-threaded output shaft in threaded engagement with the interiorly-threaded opening in the base portion of the body, such that the exteriorly-threaded output shaft is configured to rotate in a first direction upon activation of the activation system and thereby move the movable portion toward the tool channel such that the two offset fingers engage tooling when loaded in the tool channel.

29. The tool holder of claim 28 wherein the body of the moveable portion has a generally triangular configuration.

30. The tool holder of claim 28 wherein each of the two fingers has a leading end region with a ramp surface configured to engage the tooling when loaded in the tool channel.

31. The tool holder of claim 30 wherein the tool holder has a length configured to extend along a length of an upper beam of a press brake, the two leading end regions of the two fingers being spaced apart along the length of the tool holder.

32. The tool holder of claim 28 wherein the threaded engagement of the exteriorly-threaded output shaft with the interiorly-threaded opening in the base portion of the body provides a freedom of movement for the moveable portion to pivot about the exteriorly-threaded output shaft when the activation system is actuated so as to move the movable portion against the tooling loaded in the tool channel.

33. The tool holder of claim 32 wherein the movable portion is received in a pocket of the tool holder that is configured to limit the freedom of movement for the movable portion to pivoting about the exteriorly-threaded output shaft by no more than 5 degrees either clockwise or counterclockwise.

34. The tool holder of claim 28 wherein the activation system is an electrical activation system comprising a motor and a gearbox from which the exteriorly-threaded output shaft extends.

* * * * *